US011869007B2

(12) United States Patent
Balaji

(10) Patent No.: US 11,869,007 B2
(45) Date of Patent: Jan. 9, 2024

(54) GEOCODING GEOCODE DATASETS IN KNOW YOUR CUSTOMER BLOCKCHAIN DATA BLOCKS FOR SPATIAL ANALYTICAL RISK MODELING

(71) Applicant: Bank of America Corporation, Charlotte, NC (US)

(72) Inventor: Sujatha Balaji, Kovilambakkam (IN)

(73) Assignee: Bank of America Corporation, Charlotte, NC (US)

( * ) Notice: Subject to any disclaimer, the term of this patent is extended or adjusted under 35 U.S.C. 154(b) by 73 days.

(21) Appl. No.: 17/378,224

(22) Filed: Jul. 16, 2021

(65) Prior Publication Data
US 2023/0020845 A1 Jan. 19, 2023

(51) Int. Cl.
*G06Q 20/40* (2012.01)
*H04L 9/32* (2006.01)
*G06Q 20/38* (2012.01)
*H04L 9/00* (2022.01)

(52) U.S. Cl.
CPC ....... *G06Q 20/4016* (2013.01); *G06Q 20/389* (2013.01); *H04L 9/3236* (2013.01); *H04L 9/50* (2022.05)

(58) Field of Classification Search
None
See application file for complete search history.

(56) References Cited

U.S. PATENT DOCUMENTS

| 9,842,334 | B1* | 12/2017 | Magi | G06Q 20/4016 |
|---|---|---|---|---|
| 10,210,518 | B2 | 2/2019 | Alnajem | |
| 2008/0203153 | A1* | 8/2008 | Keithley | G06Q 20/24 235/380 |
| 2013/0132275 | A1* | 5/2013 | Enzaldo | G06Q 20/10 705/44 |
| 2014/0201213 | A1* | 7/2014 | Jackson | G06V 10/768 707/741 |

(Continued)

OTHER PUBLICATIONS

"Flushing out the money launderers with better customer risk-rating models, McKinsey & Company, Sep. 2019, 5-11" (Year: 2019).*

(Continued)

*Primary Examiner* — Kito R Robinson
*Assistant Examiner* — Toan Duc Bui
(74) *Attorney, Agent, or Firm* — Banner & Witcoff, Ltd.

(57) ABSTRACT

Aspects of the disclosure relate to geocoding geocode datasets in KYC blockchain data blocks for spatial analytical risk modeling. In some embodiments, a computing platform may receive a client request to initiate a transaction with an enterprise organization. Using financial documentation and identification documentation associated with the client request, the computing platform may generate geocode coordinates and may identify a series of geographic risk factors. The computing platform may translate the geocode coordinates and the geographic risk factors into analytical overlays. The computing platform may stack the analytical overlays to generate an interactive spatial risk analysis model. The enterprise organization may use the interactive spatial analytical risk model to analyze the client request, and to determine whether to approve or deny the client request.

16 Claims, 17 Drawing Sheets

(56) References Cited

U.S. PATENT DOCUMENTS

| | | | | |
|---|---|---|---|---|
| 2014/0288995 A1* | 9/2014 | Huff | ............... | G06Q 10/0635 |
| | | | | 705/7.28 |
| 2015/0120436 A1* | 4/2015 | Duleba | ............ | G06Q 30/0246 |
| | | | | 705/14.54 |
| 2015/0339769 A1* | 11/2015 | deOliveira | ............ | G06Q 40/03 |
| | | | | 705/38 |
| 2017/0200151 A1* | 7/2017 | Bruno | ............... | H04W 12/068 |
| 2019/0303939 A1* | 10/2019 | Kurian | ............... | G06Q 20/36 |
| 2020/0167870 A1 | 5/2020 | Isaacson et al. | | |
| 2020/0219187 A1* | 7/2020 | Zarrad | ............... | G06Q 30/04 |
| 2020/0285374 A1 | 9/2020 | Collins | | |

OTHER PUBLICATIONS

"Kousik Nath, System Design: Design a Geo-Spatial index for real-time location search, Oct. 23, 2020, 17-27" (Year: 2020).*

* cited by examiner

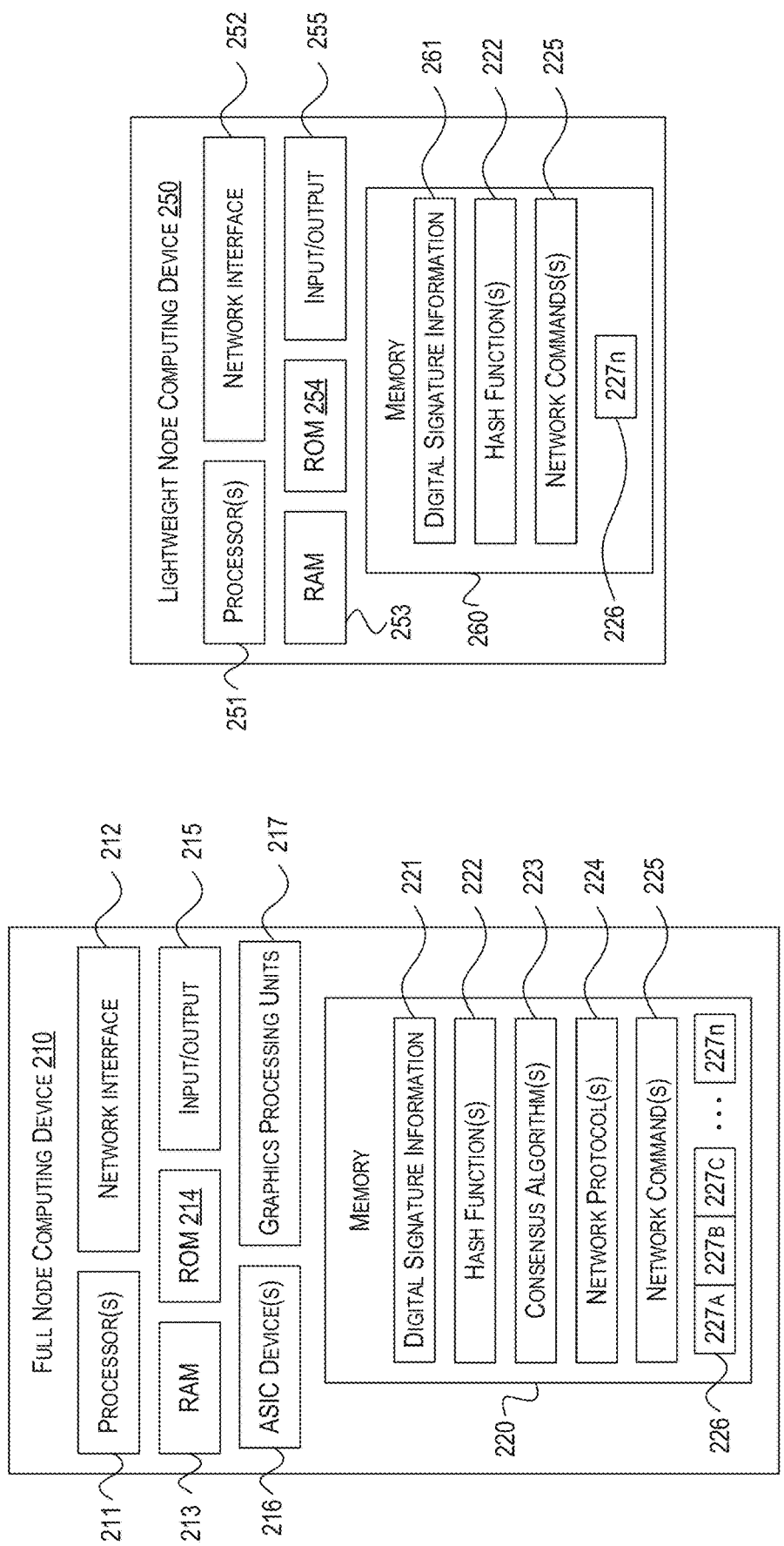

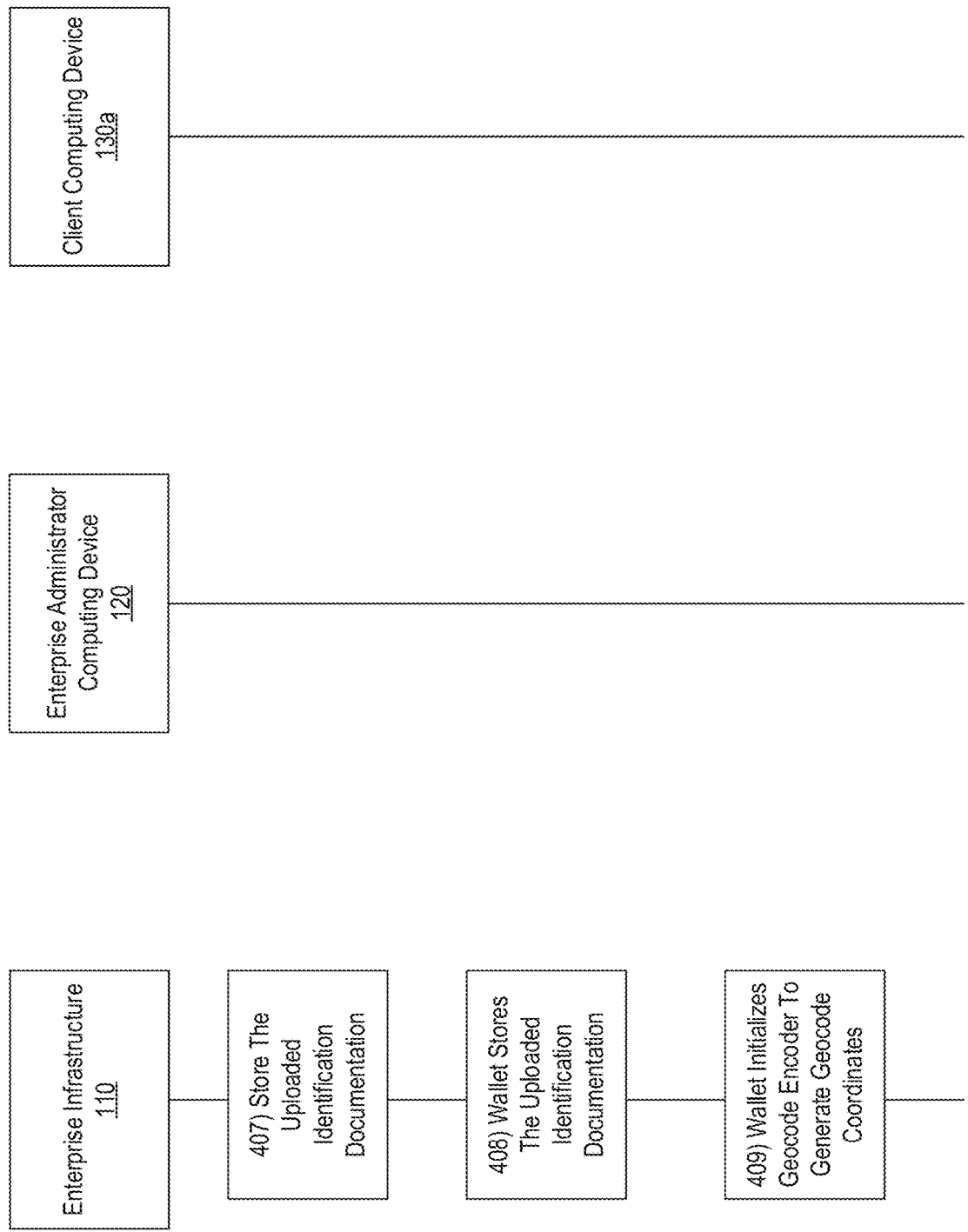

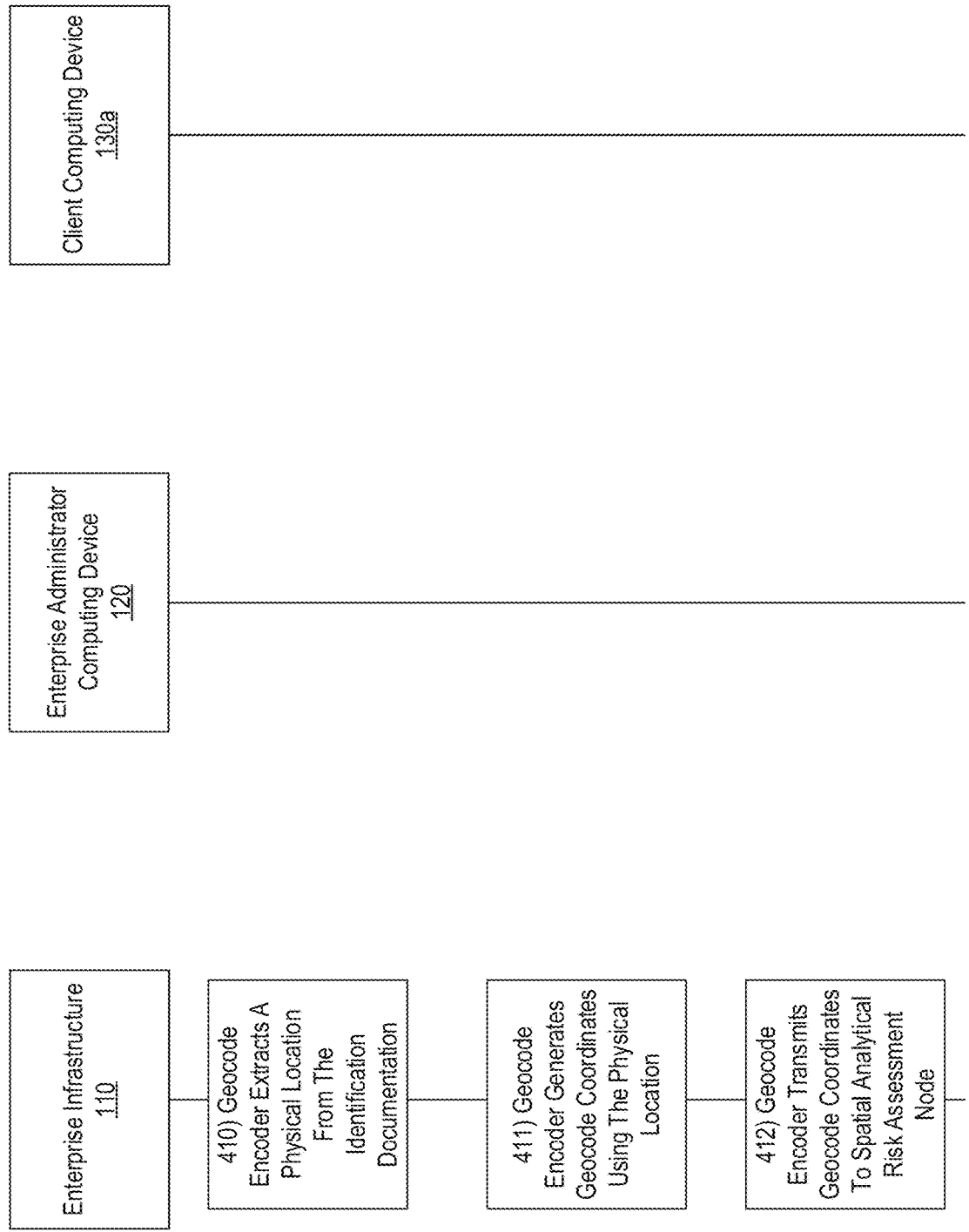

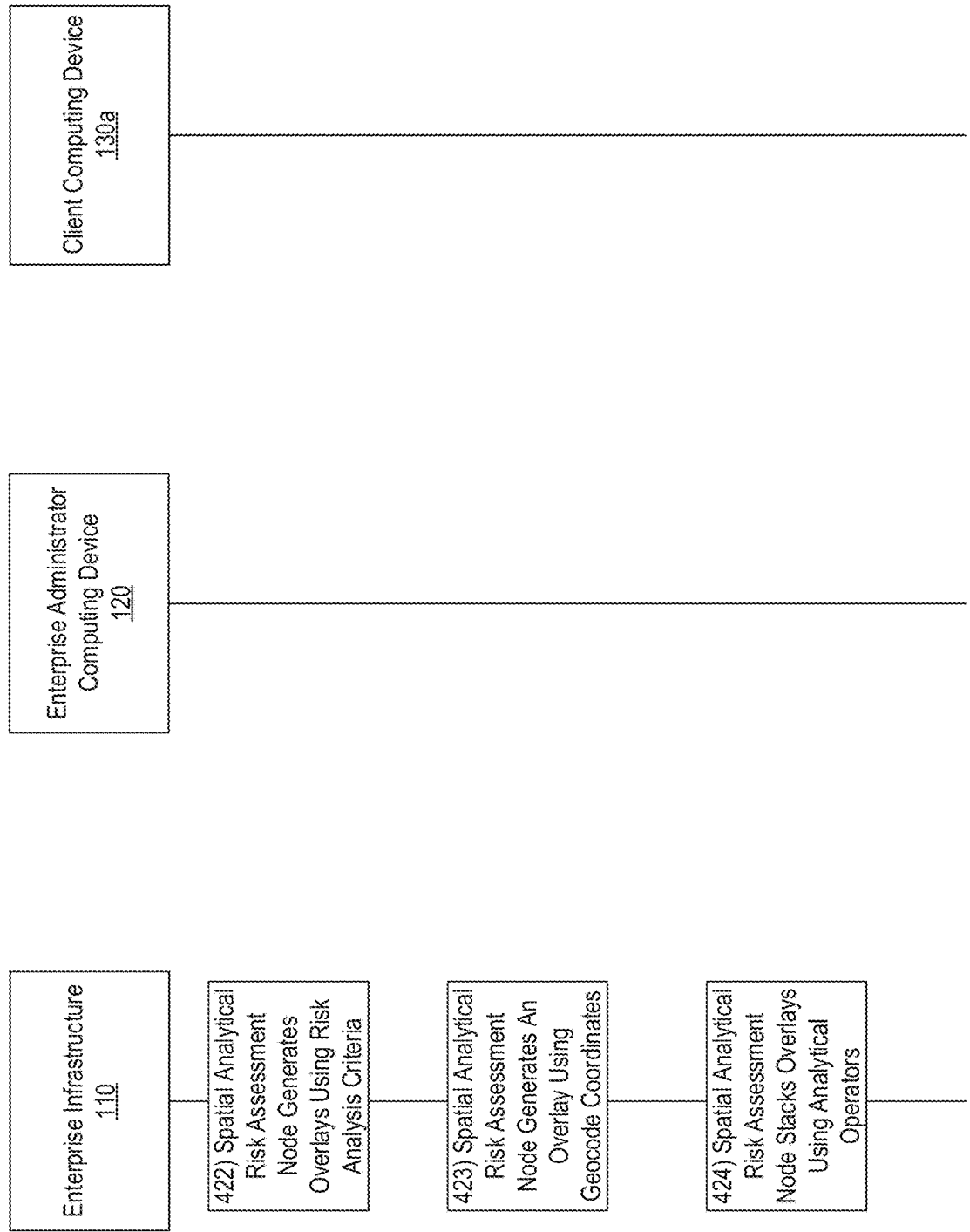

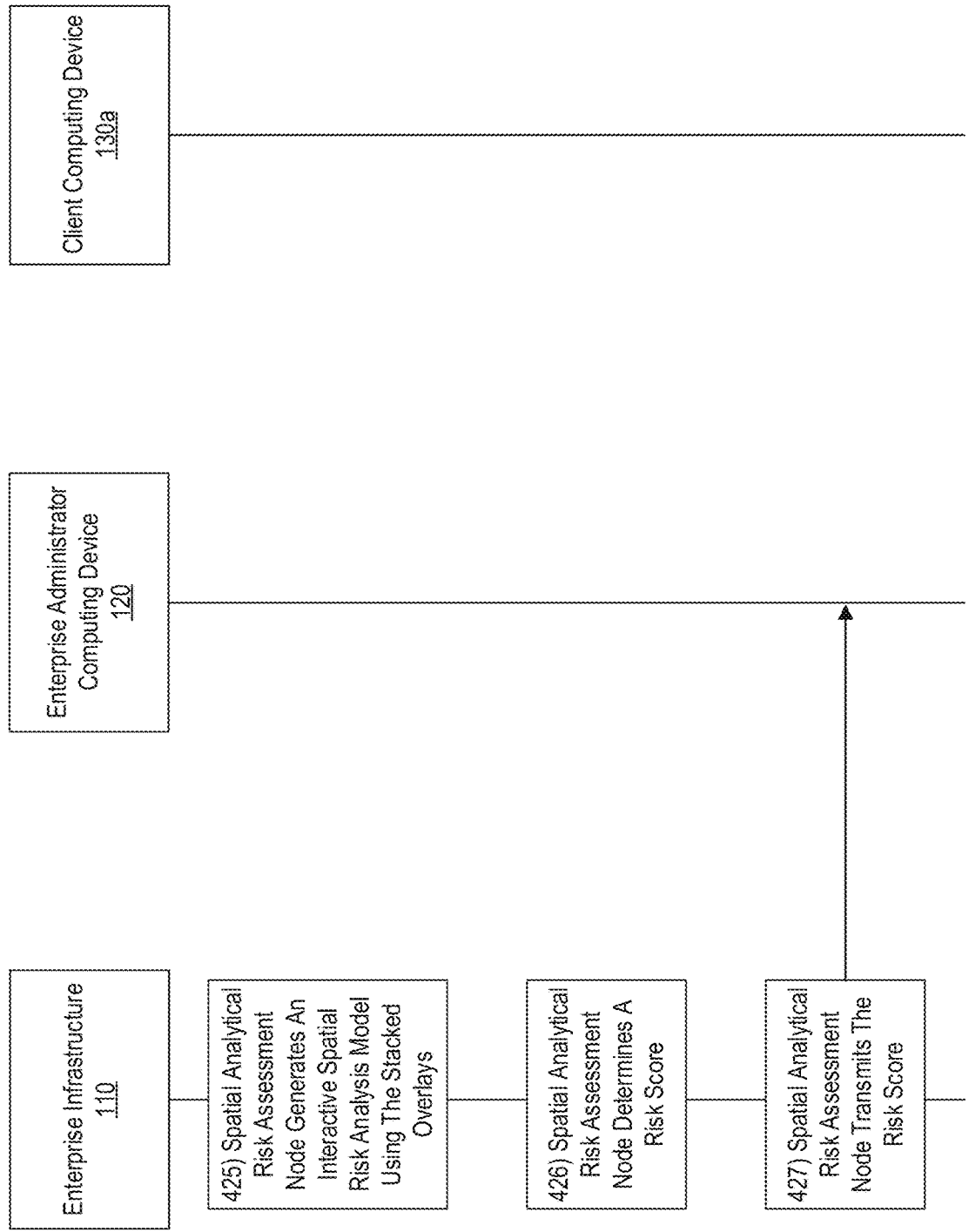

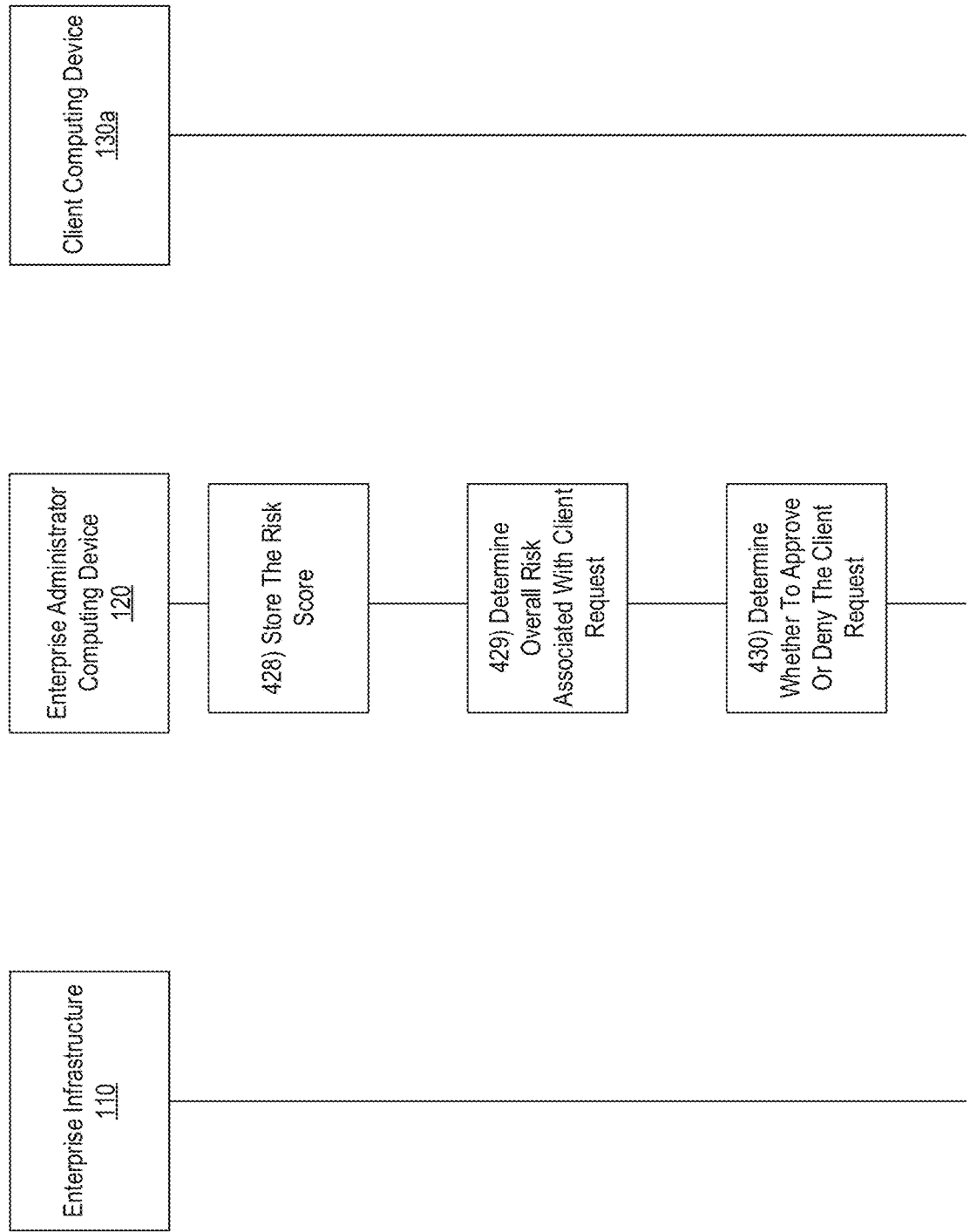

GEOCODING GEOCODE DATASETS IN KNOW YOUR CUSTOMER BLOCKCHAIN DATA BLOCKS FOR SPATIAL ANALYTICAL RISK MODELING

BACKGROUND

Aspects of the disclosure relate to hardware and software for geocoding geocode datasets in know your customer blockchain data blocks for spatial analytical risk modeling. In particular, one or more aspects of the disclosure relate to generating geocode coordinates and generating an interactive spatial risk analysis model, comprised of stacked overlays, to investigate client requests to initiate a transaction with an enterprise organization.

Current risk assessment protocols within enterprise organizations require in-depth data discovery and investigations prior to approving or denying a transaction requested by a client. In particular, an enterprise organization may: (1) perform Know Your Client ("KYC") processing; (2) request identification documentation and financial records from the client; (3) perform a credit risk analysis using the client's financial history and geographic location; and (4) generate a decision in response to the transaction requested by the client. The time that is used to perform steps (1)-(4) causes the enterprise organization to delay its decision in response to the transaction requested by the client. As such, current risk assessment protocols do not permit an enterprise organization to make real-time, informed decisions in response to the transaction requested by the client.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with geocoding geocode datasets in KYC blockchain data blocks for spatial analytical risk modeling.

In accordance with one or more embodiments, a method may comprise, at a computing device configured to operate in a peer-to-peer (P2P) network and including at least one or more processors and memory storing at least a portion of a blockchain of the P2P network, receiving, from a client computing device associated with a client, a client request to initiate a transaction at an enterprise organization. The method may comprise receiving, from the client computing device and in response to the receiving the client request, financial documentation associated with the client and identification documentation associated with the client. The method may comprise determining, based on the received financial documentation, a projected credit score associated with the client. The method may comprise determining, based on the received identification documentation, geocode coordinates indicating a geographic location associated with the client request to initiate the transaction at the enterprise organization. The method may comprise generating a plurality of analytical overlays. The method may comprise determining, based on the plurality of the analytical overlays, a risk score associated with the client request to initiate the transaction at the enterprise organization. The method may comprise analyzing the projected credit score associated with the client and the risk score associated with the client request to initiate the transaction at the enterprise organization. The method may comprise generating a notification, wherein the notification indicates one of approval of the client request to initiate the transaction at the enterprise organization or rejection of the client request to initiate the transaction at the enterprise organization.

In accordance with one or more embodiments, a computing platform may comprise at least one processor, a communication interface communicatively coupled to the at least one processor, and memory storing computer-readable instructions that, when executed by the at least one processor, cause the computing platform to receive, from a client computing device associated with a client, a client request to initiate a transaction at an enterprise organization. The computing platform may receive, from the client computing device and in response to the receiving the client request, financial documentation associated with the client and identification documentation associated with the client. The computing platform may determine, based on the received financial documentation, a projected credit score associated with the client. The computing platform may determine, based on the received identification documentation, geocode coordinates indicating a geographic location associated with the client request to initiate the transaction at the enterprise organization. The computing platform may generate a plurality of analytical overlays. The computing platform may determine, based on the plurality of the analytical overlays, a risk score associated with the client request to initiate the transaction at the enterprise organization. The computing platform may analyze the projected credit score associated with the client and the risk score associated with the client request to initiate the transaction at the enterprise organization. The computing platform may generate a notification, wherein the notification indicates one of approval of the client request to initiate the transaction at the enterprise organization or rejection of the client request to initiate the transaction at the enterprise organization.

In accordance with one or more embodiments, one or more non-transitory computer-readable media storing instructions that, when executed by a computing platform comprising at least one processor, memory, and a communication interface, cause the computing platform to receive, from a client computing device associated with a client, a client request to initiate a transaction at an enterprise organization. The instructions, when executed, may cause the computing platform to receive, from the client computing device and in response to the receiving the client request, financial documentation associated with the client and identification documentation associated with the client. The instructions, when executed, may cause the computing platform to determine, based on the received financial documentation, a projected credit score associated with the client. The instructions, when executed, may cause the computing platform to determine, based on the received identification documentation, geocode coordinates indicating a geographic location associated with the client request to initiate the transaction at the enterprise organization. The instructions, when executed, may cause the computing platform to generate a plurality of analytical overlays. The instructions, when executed, may cause the computing platform to determine, based on the plurality of the analytical overlays, a risk score associated with the client request to initiate the transaction at the enterprise organization. The instructions, when executed, may cause the computing platform to analyze the projected credit score associated with the client and the risk score associated with the client request to initiate the transaction at the enterprise organization. The instructions, when executed, may cause the computing platform to generate a notification, wherein the notification indicates one of approval of the client request to initiate the transaction at the enterprise organization or rejection of the client request to initiate the transaction at the enterprise organization.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIG. 3A depicts an illustrative example of a full node computing device that may be used for geocoding geocode datasets in KYC blockchain data blocks for spatial analytical risk modeling in accordance with one or more example embodiments;

FIG. 3B depicts an illustrative example of a lightweight node computing device that may be used for geocoding geocode datasets in KYC blockchain data blocks for spatial analytical risk modeling in accordance with one or more example embodiments;

FIGS. 4A-4K depict an illustrative event sequence for geocoding geocode datasets in KYC blockchain data blocks for spatial analytical risk modeling in accordance with one or more example embodiments;

DETAILED DESCRIPTION

Figure 1A:
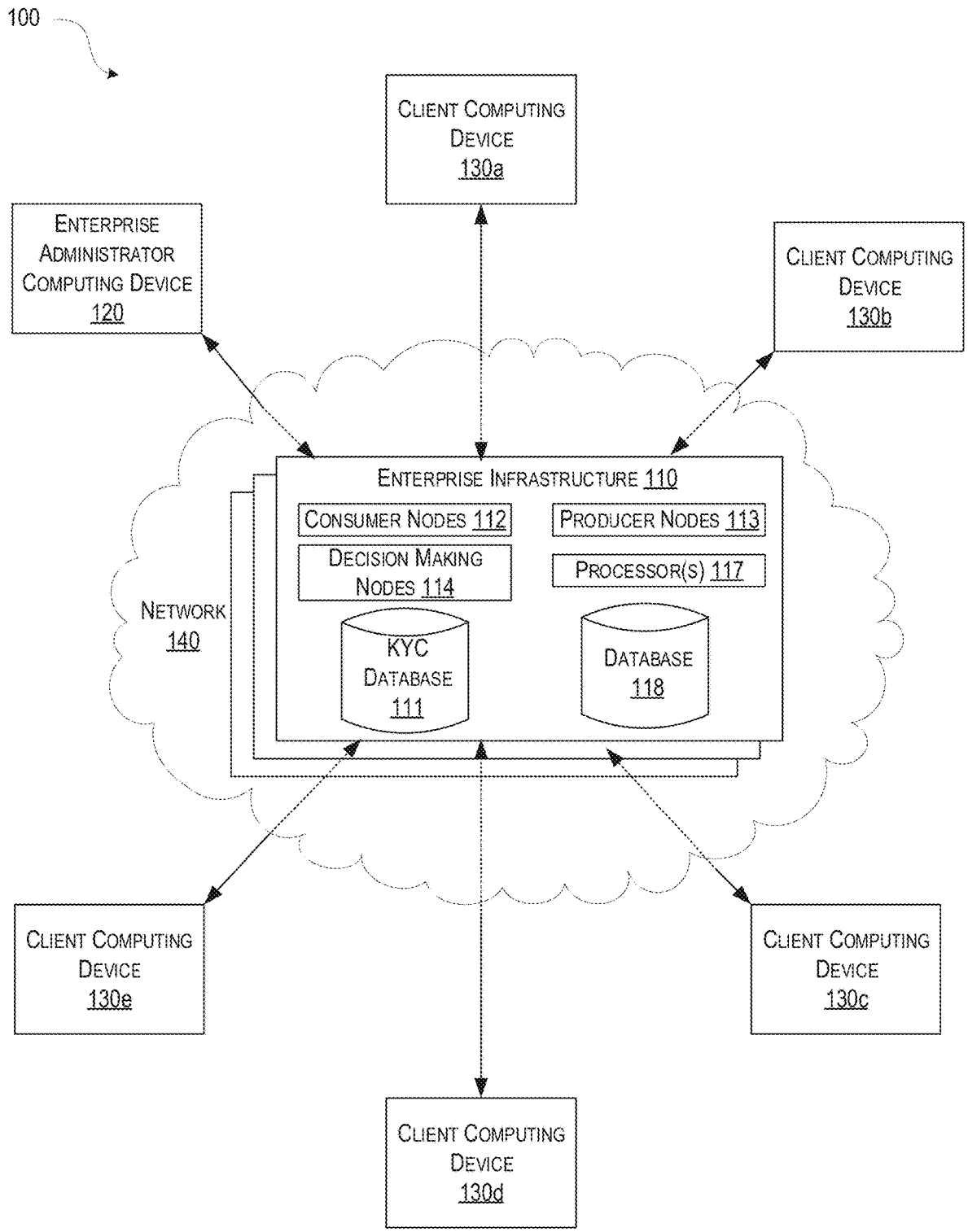
FIG. 1A depicts an illustrative example of a centralized computer system for geocoding geocode datasets in KYC blockchain data blocks for spatial analytical risk modeling in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current risk assessment protocols within enterprise organizations require in-depth data discovery and investigations prior to approving or denying a transaction requested by a client. Accordingly, proposed herein is a solution to the problem described above that includes geocoding geocode datasets in KYC blockchain data blocks to perform spatial analytical risk modeling and to assist enterprise organizations in making informed, real-time decisions regarding client-initiated transaction requests. For example, a KYC blockchain network may contain consumer nodes, producer nodes, and decision making nodes. The enterprise organization may direct a client to interact with the producer nodes to establish a client account or digital wallet. A client may use the producer nodes to upload required financial documentation and identification documentation. The consumer nodes may use the uploaded financial documentation and identification documentation to generate a projected credit score associated with the client. The decision making nodes may use the uploaded identification documentation to convert a physical address into geocode coordinates and to generate a geocode overlay. The decision making nodes may stack the geocode overlay onto additional risk factor overlays to generate an interactive spatial risk analysis model. The decision making nodes may use the interactive spatial risk analysis model to determine a risk score. The enterprise organization may consider the risk score alongside the client's projected credit score to determine whether to approve or deny the transaction request submitted by the client.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A client may access the decentralized P2P system through a specialized "wallet" (i.e., Identity Wallet) that may uniquely identify the client and enable the client to perform functions related to the decentralized P2P network. Through the wallet, the client may be able to hold currency, submit transaction requests to an enterprise organization, or any other function associated with the decentralized P2P system. Furthermore, the client may use the wallet to request performance of network-specific functions related to the decentralized P2P system such as fund and/or asset transfers. The various computing devices forming the decentralized P2P computing system may operate as a team to perform network-specific functions requested by the client. In performing the network-specific functions, the various computing devices may produce blocks that store the data generated during the performance of the network-specific functions and may add the blocks to the blockchain. After the block has been added to the blockchain, the wallet associated with the client may indicate that the requested network-specific function has been performed.

For example, a client's wallet may contain identification documentation associated with the client. The client may use the identification documentation in the wallet to submit, to an enterprise organization, a request to initiate a transaction (e.g., a request for a small business loan). The client may provide the request to submit an application for a small business loan to the decentralized P2P system. The various computing devices forming the decentralized P2P computing system may extract the identification documentation from the wallet and may perform the request. In doing so, a block may be created by the various computing devices of the decentralized P2P computing system. The block may store data indicating that the request for a small business loan was submitted to the enterprise organization. The various computing devices may add the block to the blockchain. The wallet associated with the client may reflect the submission of the small business loan application.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as client-initiated transaction requests and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, financial loan requests, cryptocurrency, digital content storage and delivery, entity authentication and authorization, digital identity, marketplace creation and operation, internet of things (IoT), prediction platforms, currency exchange and remittance, P2P transfers, ride sharing, gaming, and precious metal and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system which may request the performance of network functions (e.g., client-initiated transaction requests, smart contract operations, and the like) within a decentralized network, but might not be capable of executing the requested network functions or maintaining inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be requested by full nodes in the decentralized system.

"Network functions" and/or "network-specific functions," as described herein, may relate to functions which are able to be performed by nodes of a decentralized P2P network. In some arrangements, the data generated in performing network-specific functions may be stored on a blockchain associated with the decentralized P2P network. Examples of network functions may include "smart contract operations" and/or "client-initiated transaction requests." A smart contract operation, as used herein, may describe one or more operations performed by a "smart contract," which may be one or more algorithms and/or programs associated with one or more nodes within a decentralized P2P network. An enterprise organization transaction request may describe a request, submitted by a client, to initiate a transaction with an enterprise organization and may be associated with one or more nodes within a decentralized network.

Computer Architecture

FIG. 1A depicts an illustrative example of centralized computer system 100 that may be used for geocoding geocode datasets in KYC blockchain data blocks for spatial analytical risk modeling. Centralized computer system 100 may comprise one or more computing devices including at least enterprise infrastructure 110, enterprise administrator computing device 120, and client computing device(s) 130a-130e. While FIG. 1A depicts more than one client computing device (e.g. client computing devices 130a-130e), each of client computing device 130a-130e may be configured in accordance with the features described herein. While the description herein may make reference to client computing device 130a, it is important to note that the functions described in connection with client computing device 130a may also be performed by any one of client computing devices 130b-130e. Each one of client computing devices 130a-130e and enterprise administrator computing device 120 may be configured to communicate with enterprise infrastructure 110 through network 140. In some arrangements, centralized computer system 100 may include additional computing devices and networks that are not depicted in FIG. 1A, which may also be configured to interact with enterprise infrastructure 110 and, in some instances, client computing devices 130a-130e.

Enterprise infrastructure 110 may be associated with a distinct entity such as an enterprise organization, company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Enterprise infrastructure 110 may include computing hardware and software that may host various data and applications for performing tasks of the centralized entity and interacting with client computing devices 130a-130e, as well as other computing devices. As discussed in greater detail below in connection with FIG. 1B, enterprise infrastructure 110 may use KYC database 111, consumer nodes 112, producer nodes 113, and decision making nodes 114 to receive, analyze, and execute client requests. Each computing device within enterprise infrastructure 110 may contain processor(s) 117 and database 118, which may be stored in memory of the one or more computing devices of enterprise infrastructure 110. Through execution of computer-readable instructions stored in memory, the computing devices of enterprise infrastructure 110 may be configured to perform functions of the centralized entity and store the data generated during the performance of such functions in database 118.

In some arrangements, enterprise infrastructure 110 may include and/or be part of enterprise information technology infrastructure and may host a plurality of enterprise applications, enterprise databases, and/or other enterprise resources. Such applications may be executed on one or more computing devices included in enterprise infrastructure 110 using distributed computing technology and/or the like. In some instances, enterprise infrastructure 110 may include a relatively large number of servers that may support operations of the enterprise organization, such as a financial institution. Enterprise infrastructure 110, in this embodiment, may generate a single centralized ledger for data received from the various client computing devices 130, which may be stored in databases 118.

Each of the client computing devices 130a-130e may be configured to interact with enterprise infrastructure 110 through network 140. In some instances, one or more of the client computing devices 130a-130e may be configured to receive and transmit information corresponding to system requests through particular channels and/or representations of webpages and/or applications associated with enterprise infrastructure 110. The system requests provided by client computing devices 130a-130e may initiate the performance of particular computational functions such as data and/or file transfers at enterprise infrastructure 110. In such instances, the one or more of the client computing devices 130a-130e may be internal computing devices associated with the particular entity corresponding to enterprise infrastructure 110 and/or may be external computing devices which are not associated with the particular entity.

As stated above, centralized computer system 100 also may include one or more networks, which may interconnect one or more of enterprise infrastructure 110 and one or more client computing devices 130a-130e and enterprise administrator computing device 120. For example, centralized computer system 100 may include network 140. Network 140 may include one or more sub-networks (e.g., local area networks (LANs), wide area networks (WANs), or the like). Furthermore, centralized computer system 100 may include a local network configured to interconnect each of the computing devices comprising enterprise infrastructure 110.

Figure 1B:
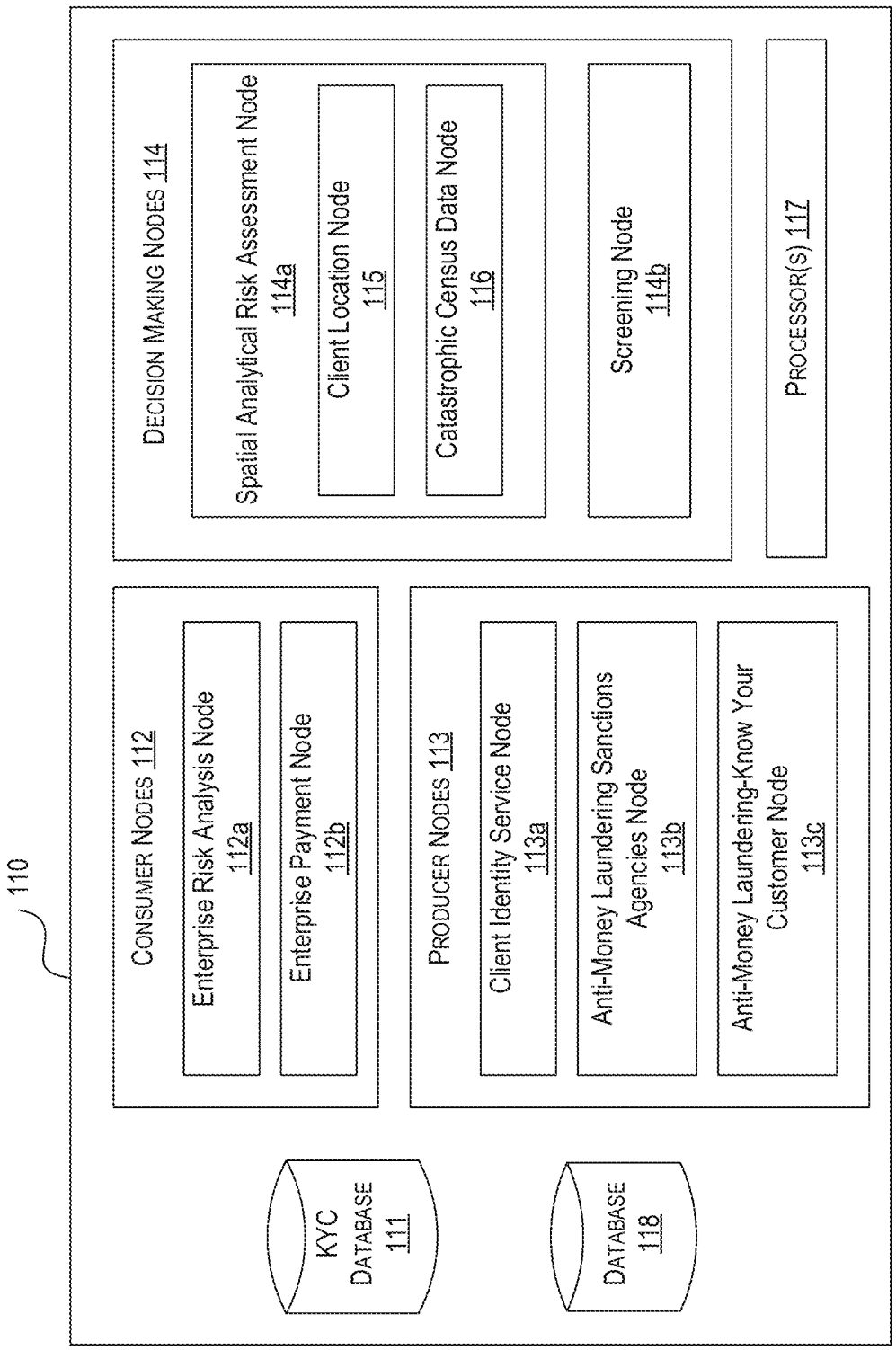
FIG. 1B depicts an illustrative example of the enterprise infrastructure that may be used for geocoding geocode datasets in KYC blockchain data blocks for spatial analytical risk modeling in accordance with one or more example embodiments.

FIG. 1B depicts the components of enterprise infrastructure 110 that may be used for geocoding geocode datasets in KYC blockchain data blocks for spatial analytical risk modeling. As discussed in connection with FIG. 1A, enterprise infrastructure 110 may contain KYC database 111, consumer nodes 112, producer nodes 113, decision making nodes 114, processor(s) 117, and database 118. KYC database 111 may contain financial information and identification information associated with a client. The financial information and identification information associated with the client may be extracted from a digital wallet associated with the client (i.e., an Identity Wallet subscription associated with the client) and may be uploaded, by an enterprise organization, into KYC database 111. Additionally or alternatively, the identification information associated with the client may be gathered by producer nodes 113.

Producer nodes 113 may allow a client to interact with the decentralized P2P system. Producer nodes 113 may permit a client to create and populate a wallet subscription, within the decentralized P2P system, containing information associated with the client. Producer nodes 113 may include client identity service node 113a, anti-money laundering sanctions agencies node 113b, and anti-money laundering-KYC node 113c. A client may interact with client identity service node 113a to initiate a wallet subscription (i.e., an Identity Wallet subscription). A client may interact with client identity service node 113a to populate the wallet with financial documentation and identification documentation. For example, a client may use client identity service node 113a to upload photo identification, government issued documentation, and/or a physical address. A client may use anti-money laundering sanctions agencies node 113b to populate the wallet with data pertaining to a business associated with the client. In particular, a client may use anti-money laundering sanctions agencies node 113b to populate the wallet with a new customer file and/or to update an existing customer file. A client may use anti-money laundering-KYC node 113c to provide further data pertaining to the business associated with the client. For example, a client may use anti-money laundering-KYC node 113c to populate the wallet with new services and/or items provided by the business associated with the client and/or to update the current services and/or items provided by the business associated with the client.

Consumer nodes 112 may allow the enterprise organization to interact with the decentralized P2P system. An enterprise organization may use consumer nodes 112 to access the data collected by producer nodes 113 and to generate enterprise-specific data associated with the client. Consumer nodes 112 may include enterprise risk analysis node 112a and enterprise payment node 112b. An enterprise organization may use enterprise risk analysis node 112a to generate data that the enterprise organization may use to analyze client-initiated transaction requests (i.e., a projected credit score associated with the client). An enterprise organization may use enterprise payment node 112b to monitor and maintain the financial history associated with the client. Additionally or alternatively, the enterprise organization may use consumer nodes 112 to search KYC database 111 and to access client data.

Decision making nodes 114 may allow the enterprise organization to interact with the decentralized P2P system. An enterprise organization may use decision making nodes 114 to generate an interactive spatial risk analysis model that the enterprise organization may use to analyze client-initiated transaction requests. Decision making nodes 114 may include spatial analytical risk assessment node 114a and screening node 114b. An enterprise organization may use screening node 114b to monitor client behavior and enterprise organization behavior to ensure both client behavior and enterprise organization behavior are in accordance with best practices and are in accordance with enterprise-specific practices. Spatial analytical risk assessment node 114a may include client location node 115 and catastrophic census data node 116. Client location node 115 may access the data collected by producer nodes 113 and may convert the physical address associated with the client into geocode coordinates. Catastrophic census data node 116 may use the data generated by client location node 115 to predict catastrophe data associated with the geocode coordinates. Spatial analytical risk assessment node 114a may use the data generated by client location node 115 and catastrophic census data node 116 to create a plurality of analytical overlays, which may be combined to create an interactive spatial risk analysis model.

The data collected by producer nodes 113 may inform the data generated by consumer nodes 112 and decision making nodes 114. As discussed in greater detail in connection with FIGS. 4A-4K, the data collected and generated by consumer nodes 112, producer nodes 113, and decision making nodes 114 may be used for geocoding geocode datasets in KYC blockchain data blocks for spatial analytical risk modeling.

Figure 2:
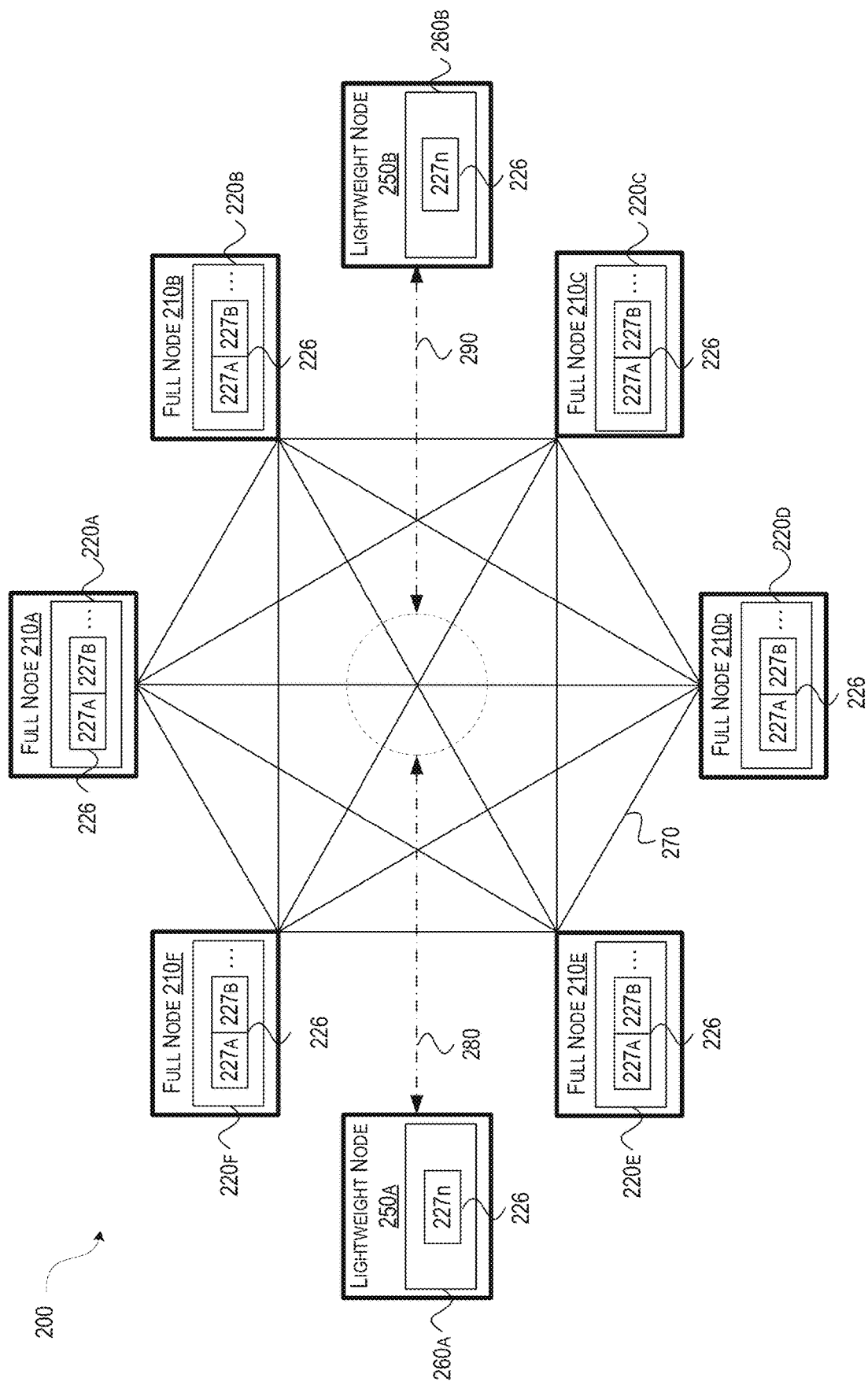
FIG. 2 depicts an illustrative example of a decentralized P2P computer system that may be used for geocoding geocode datasets in KYC blockchain data blocks for spatial analytical risk modeling in accordance with one or more example embodiments.

FIG. 2 depicts an illustrative example of decentralized P2P computer system 200 that may be used for geocoding geocode datasets in KYC blockchain data blocks for spatial analytical risk modeling. Decentralized P2P computer system 200 may include a plurality of full node computing devices 210A, 210B, 210C, 210D, 210E, and 210F and lightweight node computing devices 250A and 250B, which may be respectively similar to full node computing device 210 described in FIG. 3A and lightweight node computing device 250 described in FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270. Enterprise administrator computing device 120 may be one of full node computing devices 210A-210F as enterprise administrator computing device 120 may cause functions to be executed within decentralized P2P computer system 200.

Lightweight node computing devices 250A and 250B may request execution of network functions related to blockchain 226 in decentralized P2P network 270. In order to request execution of network functions, such as a client-initiated transaction request and/or smart contract operations, processors of lightweight node computing devices 250A and 250B may execute network commands to broadcast the network functions to decentralized P2P network 270 comprising full node computing devices 210A-210F. Client computing devices 130a-130e may be one of lightweight node computing devices 250A or 250B as client computing devices 130a-130e may submit function requests to decentralized P2P network 270.

In some arrangements, a plurality of network function requests may be broadcasted across decentralized network P2P network 270. Processors, ASIC devices, and/or GPUs of full node computing devices 210A-210F may execute network protocols to receive broadcast of each of the network functions through decentralized P2P network 270 and from the requesting entities, including lightweight node computing devices 250A and 250B.

FIG. 3A depicts an illustrative example of a full node computing device 210 that may be used for geocoding geocode datasets in KYC blockchain data blocks for spatial analytical risk modeling. Full node computing device 210 may be any of a personal computer, server computer, handheld or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and to request execution of network functions, and/or to execute requested network functions and to maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

In order to request execution of network functions, such as a client-initiated transaction request and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221. In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node.

Memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used for geocoding geocode datasets in KYC blockchain data blocks for spatial analytical risk modeling. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, or the like, and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it might not be configured to execute network functions and/or to maintain a blockchain of a decentralized P2P network. In other aspects, lightweight node computing device 250 may have substantially the same physical configuration as full node computing device 210, but may be configured with different programs and/or software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary support and/ or other functionality, which may or might not be used in conjunction with aspects described herein.

In comparison to full node computing device 210, lightweight node computing device 250 might not include, in some instances, specialized hardware such as ASIC devices 216 and/or GPUs 217. This may be because lightweight node computing device 250 might not be configured to execute network functions and/or to maintain a blockchain of a decentralized P2P network as is full node computing device 210.

Memory 260 of lightweight node computing device 250 may store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210. Each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. The private/public key information of each node, whether full or lightweight, in a decentralized P2P computing network may be unique to that particular node.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as a client-initiated transaction request and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Figure 4A:
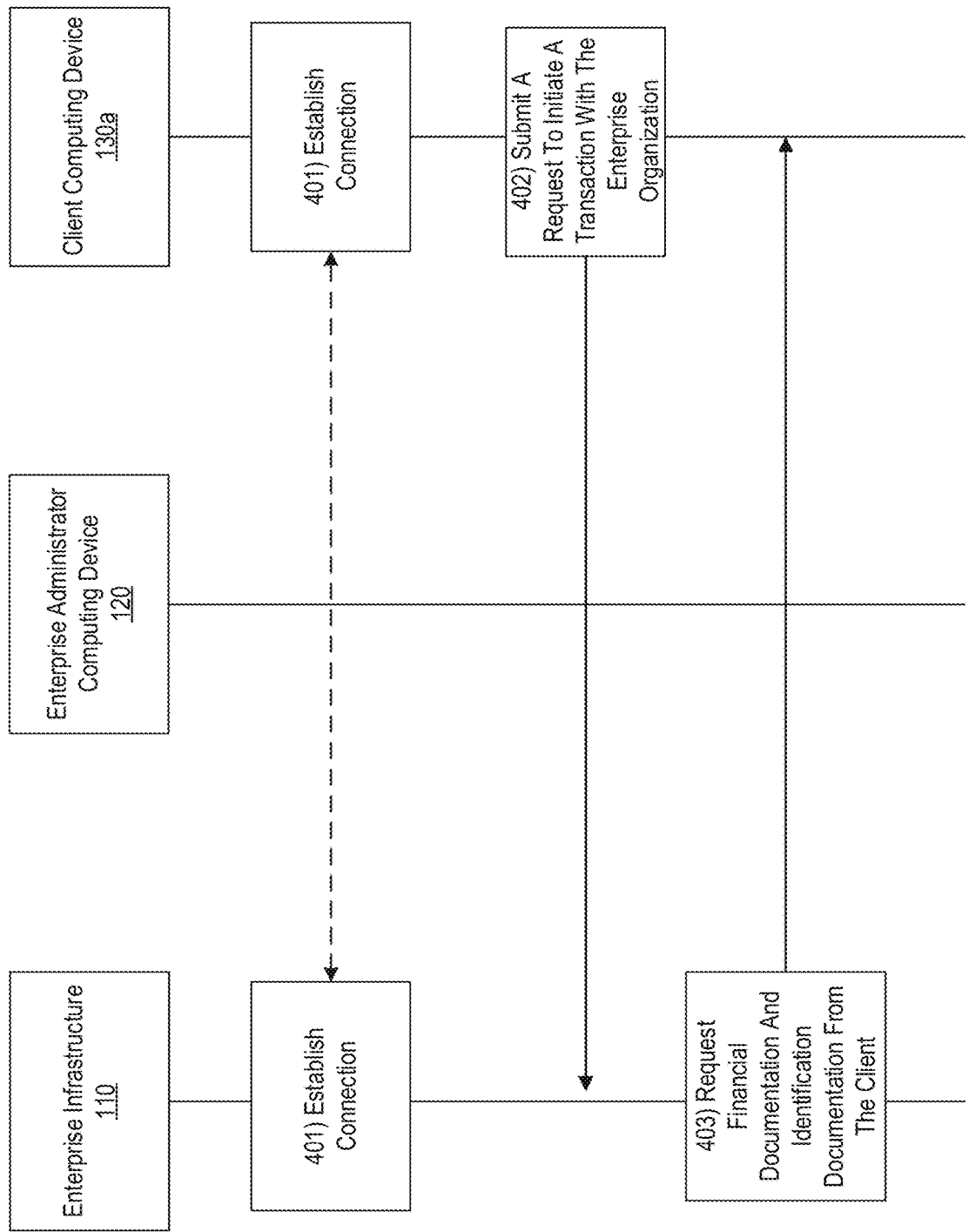

Memory 260 of lightweight node computing device 250 may store blockchain 226. Blockchain 226 stored in memory 260 of lightweight node computing device 250 may include at least block 227n, wherein block 227n represents the most immediate block of blockchain 226. As such, blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network Geocoding Geocode Datasets in KYC Blockchain for Spatial Analytical Risk Modeling FIGS. 4A-4K depict an illustrative event sequence for geocoding geocode datasets in KYC blockchain data blocks for spatial analytical risk modeling. Referring to FIG. 4A, at step 401, enterprise infrastructure 110 may establish a network connection with client computing device 130a. The connection between enterprise infrastructure 110 and client computing device 130a may be established across network 140. As discussed in subsequent steps, client computing device 130a may transmit financial documentation and identification documentation to enterprise infrastructure 110. As such, the network connection between enterprise infrastructure 110 and client computing device 130a may facilitate the data transmission between enterprise infrastructure 110 and client computing device 130a.

At step 402, client computing device 130a may submit a request, to enterprise infrastructure 110, to initiate a transaction with the enterprise organization. The client associated with client computing device 130a may use client computing device 130a to navigate to a webpage or web application associated with the enterprise organization. Using the webpage or web application associated with the enterprise organization, client computing device 130a may locate the client portal for transaction request submissions.

For example, client computing device 130a may be associated with a small business owner. The small business owner may be interested in requesting a small business loan from the enterprise organization. To do so, the small business owner may use client computing device 130a to navigate to the webpage or web application associated with the enterprise organization. The small business owner may locate the client request submission portal and may initiate a request for a small business loan.

At step 403, enterprise infrastructure 110 may, in response to receiving the client request in step 402, request documentation from client computing device 130a. The requested documentation may include financial documentation and identification documentation. Financial documentation may include records indicating financial history, assets, expected income and/or revenue, (i.e., tax filing documents, tax returns, profit and loss statements, balance sheets, and the like). Identification documentation may include government issued documents which indicate personal identifiable information (i.e., a client's full name, physical address, unique identifier, telephone number, and the like). Enterprise infrastructure 110 may request additional documentation depending on the request submitted by client computing device 130a. For example, a client-initiated request for a small business loan may require different documentation from a client-initiated request to apply for a mortgage.

Figure 4B:
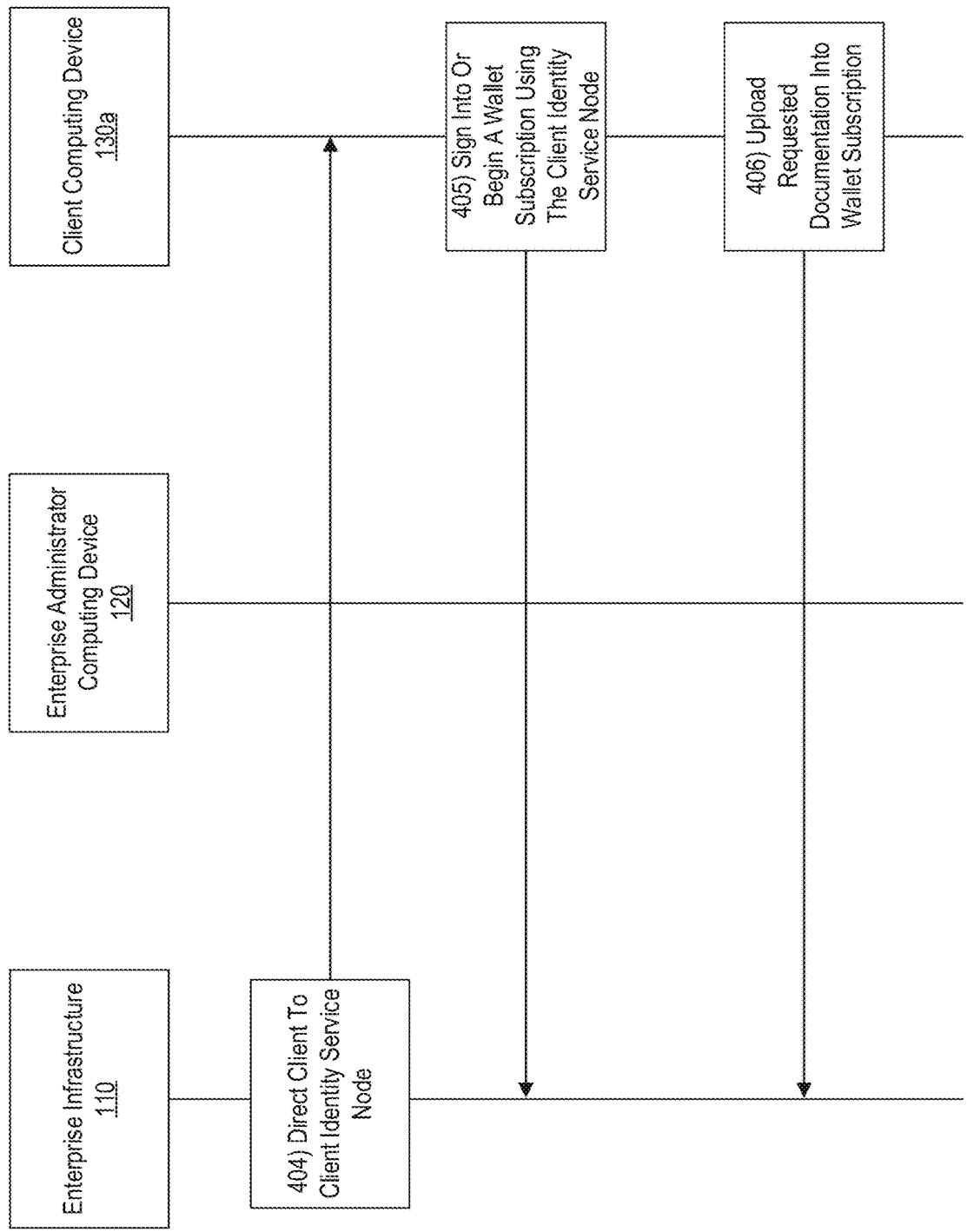

Referring to FIG. 4B, at step 404, enterprise infrastructure 110 may direct client computing device 130a to a location where client computing device 130a may submit the documentation that was requested in step 403. In particular, enterprise infrastructure 110 may direct client computing device 130a to client identity service node 113a. Client identity service node 113a may be a webpage associated with the enterprise organization webpage or may be a feature within the web application associated with the enterprise organization. Client identity service node 113a may present a number of requirements to be completed prior to submitting the requested documentation. For example, client identity service node 113a may provide a list of acceptable documents for submission or, alternatively, may provide criteria for determining whether a document is acceptable for submission. Client identity service node 113a may further indicate that a wallet subscription (i.e., an Identity Wallet subscription) may be required to submit the requested documentation. Client identity service node 113a may invite client computing device 130a to either sign into a pre-existing wallet subscription or may invite client computing device 130a to create a new wallet subscription.

At step 405, client computing device 130a may either sign into a pre-existing wallet subscription or begin a new wallet subscription. To sign into a pre-existing wallet subscription, client computing device 130a may enter the login credentials, associated with the client, that were used to create the wallet subscription. Alternatively, client computing device 130a may begin a new wallet subscription. To begin new wallet subscription, client computing device 130a may be required to enter data associated with the client (i.e., client name, physical address, phone number, email address, payment method, etc.). Client computing device 130a may receive, from client identity service node 113a, a notification indicating that the new wallet subscription was successfully created.

At step 406, client computing device 130a may upload the requested documentation into the wallet subscription associated with the client, as discussed in step 405. Client identity service node 113a may require that the documents conform to a particular document format prior to upload (i.e., .PDF, JPEG, .PNG, or the like). Client computing device 130a may configure the requested documents to ensure the requested documents conform to the document format indicated by client identity service node 113a. Client computing device 130a may gather the requested documents that conform to the required document format and may upload the requested documents into the wallet associated with the client. Additionally or alternatively, client computing device 130a may locate, within the wallet, documents that were previously uploaded into the wallet. Client computing device 130a may alter and/or remove the documents that were previously uploaded depending on the current client-initiated transaction request. For example, the current client-initiated transaction may be a small business loan request, whereas the documents within the wallet subscription may be associated with a mortgage application request. In this instance, client computing device 130a may remove the documents associated with the mortgage application request as they may not provide the information requested by enterprise infrastructure 110 in connection with the small business loan request.

Referring to FIG. 4C, at step 407, enterprise infrastructure 110 may store the uploaded documentation, discussed in step 406, in KYC database 111. As discussed in subsequent steps, enterprise infrastructure 110 may use the uploaded documentation to generate enterprise-specific data associated with the client, wherein the enterprise-specific data may be used by the enterprise organization to determine whether to approve or deny to the client-initiated transaction request. To determine whether to approve or deny the client-initiated transaction request, the enterprise organization may require a complete document history associated with the client. KYC database 111 of enterprise infrastructure 110 may contain a complete document history associated with each client. Enterprise infrastructure 110 may store the uploaded documentation to ensure the document history for each client reflects real-time changes and is up-to-date.

At step 408, the wallet subscription associated with client identity service node 113a may store the uploaded documentation. The documentation that is stored within the wallet subscription may remain within the wallet subscription until and/or unless the documentation is altered by client computing device 130a associated with the client.

At step 409, the wallet subscription may initialize a geocode encoder to generate geocode coordinates. Initializing the geocode encoder may comprise ensuring the geocode encoder is able to receive a physical address as input, to extract a physical location from a document, and to convert one form of data into a different form of data. If the geocode encoder is able to receive a physical address as input, to extract a physical location from a document, and to convert one form of data into a different form of data, then the initialization process may end. Additionally or alternatively, if the geocode encoder is unable to receive a physical address as input, unable to extract a physical location from a document, and/or unable to convert one form of data into a different form of data, then the initialization process may repeat until the geocode encoder is able to receive a physical address as input, to extract a physical location from a document, and to convert one form of data into a different form of data.

Referring to FIG. 4D, at step 410, the geocode encoder may extract a physical location from the identification documentation associated with the client, which was uploaded in step 406. To extract the physical location from the uploaded identification documentation, the geocode encoder may perform optical character recognition processing ("OCR processing") on the identification documentation. In particular, the geocode encoder may scan the identification documentation to identify a physical location associated with the client. The physical location associated with the client may be a location of a property associated with the client-initiated transaction request (e.g., a property for which a client is applying for a mortgage, a property associated with a business for which the client is applying for a business loan, or the like).

To identify a physical location associated with the client, the geocode encoder may use OCR processing to identify at least one component of a physical address (i.e., a street name, a town, a state, a country, and/or a zip code). If the geocode encoder successfully identifies at least one component of a physical address, then the geocode encoder may perform OCR processing on the data surrounding the identified component to gather additional components of the physical location. The geocode encoder may continue OCR processing until the geocode encoder identifies, in its entirety, the physical location associated with the client.

At step 411, the geocode encoder may use the physical location associated with the client, identified in step 410, to generate geocode coordinates. To generate geocode coordinates, the geocode encoder may use the physical location associated with the client and/or the property associated with the client-initiated transaction request to determine where, on the Earth's surface, the client is located and/or where, on the Earth's surface, the property associated with the client-initiated transaction request is located. The geocode encoder may identify longitude and latitude coordinates that correspond to the client's location on the Earth's surface. The geocode encoder may concatenate the longitude and latitude coordinates to generate geocode coordinates.

At step 412, the geocode encoder may transmit the geocode coordinates, generated in step 411, to spatial analytical risk assessment node 114a of enterprise infrastructure 110. As discussed in subsequent steps, spatial analytical risk assessment node 114a may use the geocode coordinates to generate an interactive spatial risk analysis model comprised of a series of analytical overlays.

Figure 4E:
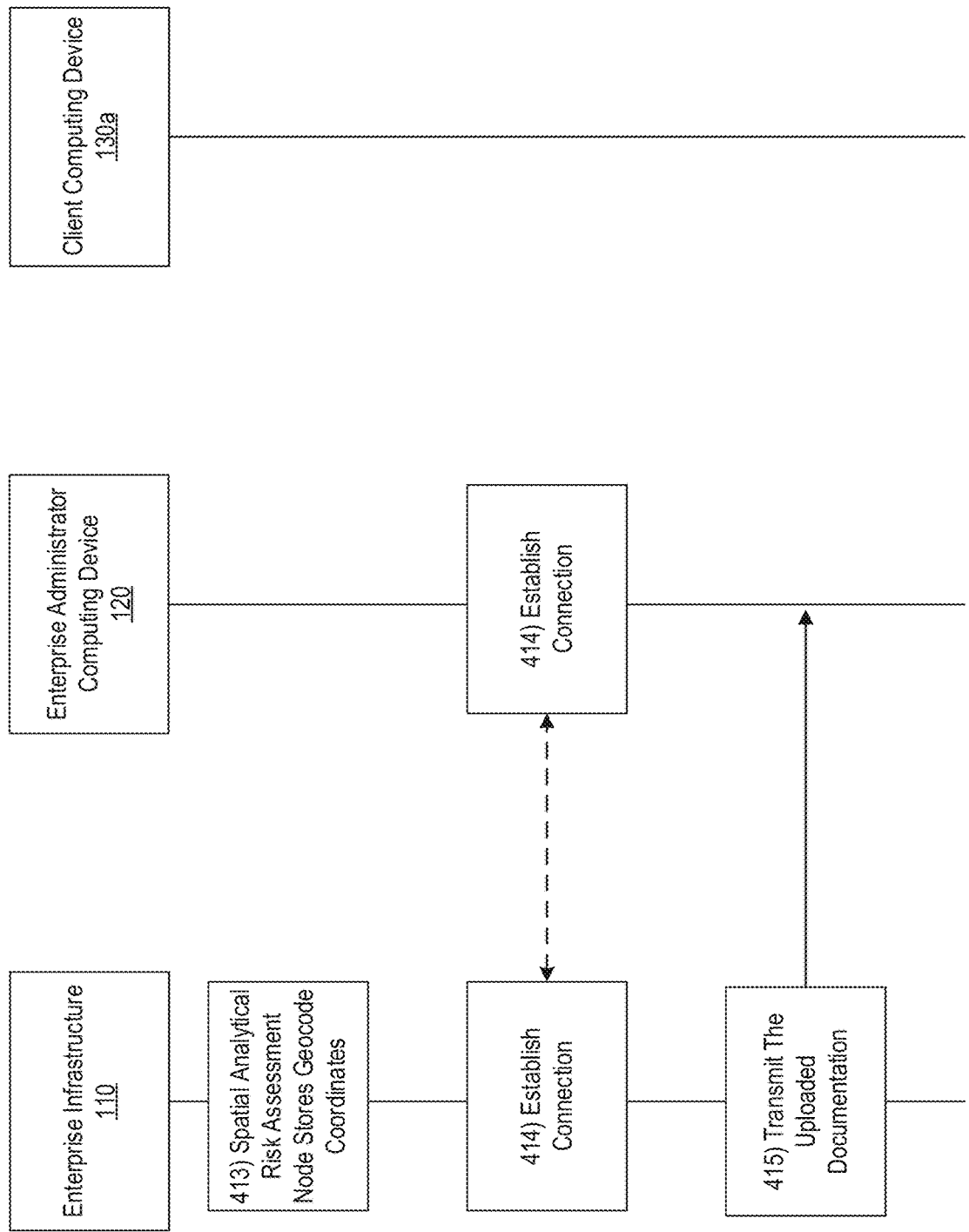

Referring to FIG. 4E, at step 413, spatial analytical risk assessment node 114a of enterprise infrastructure 110 may store the geocode coordinates, generated in step 411, in KYC database 111 of enterprise infrastructure 110. KYC database 111 of enterprise infrastructure 110 may contain a complete document history associated with each client. KYC database 111 may further include data pertaining to the location associated with the client. For example, KYC database 111 may contain the geographic risk factors, discussed in subsequent steps, associated with the client. Spatial analytical risk assessment node 114a may store the geocode coordinates to ensure the location data for each client is up-to-date and reflects any changes in the client location. As discussed in subsequent steps, spatial analytical risk assessment node 114a may use the geocode coordinates to generate an interactive spatial risk analysis model comprised of a series of analytical overlays.

At step 414, enterprise infrastructure 110 may establish a network connection with enterprise administrator computing device 120. The connection between enterprise infrastructure 110 and enterprise administrator computing device 120 may be established across network 140. As discussed in subsequent steps, enterprise administrator computing device 120 may generate and transmit risk analysis criteria and a risk score to enterprise infrastructure 110. As such, the network connection between enterprise infrastructure 110 and enterprise administrator computing device 120 may facilitate the data transmission between enterprise infrastructure 110 and enterprise administrator computing device 120.

At step 415, enterprise infrastructure 110 may transmit, to enterprise administrator computing device 120, the financial documentation and identification documentation uploaded to the wallet subscription in step 406. The transmission of the financial documentation and the identification documentation may occur over the network connection established in step 414. As discussed in subsequent steps, enterprise administrator computing device 120 may require the identification documentation to generate an interactive spatial risk analysis model. Furthermore, as discussed in subsequent steps, enterprise administrator computing device 120 may require the financial documentation associated with the client to generate enterprise-specific data that the enterprise organization may use to determine whether to approve or deny the client-initiated transaction request.

Figure 4F:
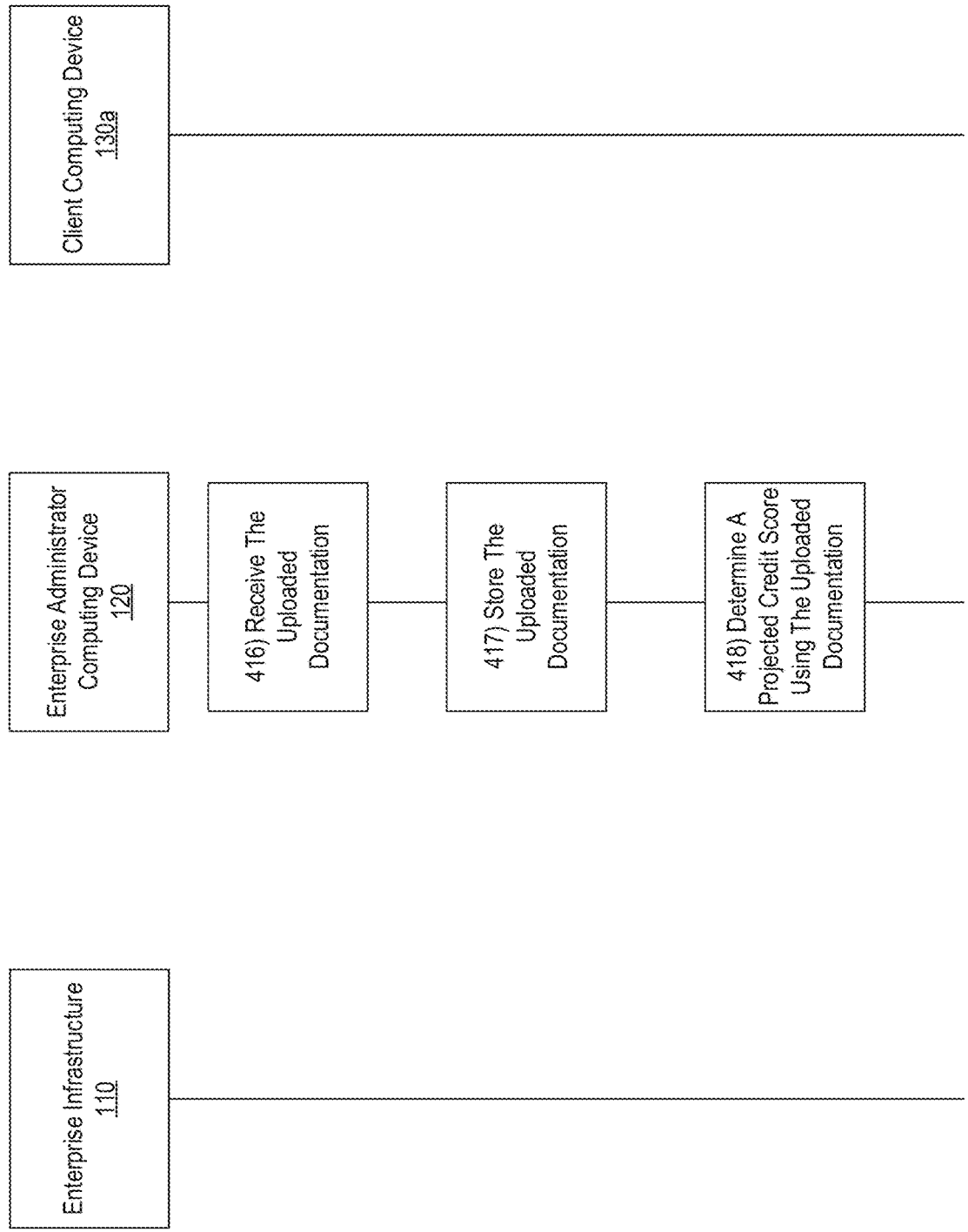

Referring to FIG. 4F, at step 416, enterprise administrator computing device 120 may receive the financial documentation and identification documentation that was transmitted from enterprise infrastructure 110 in step 415. Enterprise administrator computing device 120 may receive the documentation using the network connection established in step 414.

At step 417, enterprise administrator computing device 120 may store the financial documentation and identification documentation that was transmitted from enterprise infrastructure 110 in step 415. As discussed in connection with FIG. 2, enterprise administrator computing device 120 may be one of full node computing device 210A-210F. As such, enterprise administrator computing device 120 may store the financial documentation and identification documentation in memory 220 of any one of full node computing device 210A-210F.

At step 418, enterprise administrator computing device 120 may determine a projected credit score, associated with the client, using the financial documentation transmitted in step 415. Financial documentation may include records indicating financial history, assets, expected income and/or revenue, (i.e., tax filing documents, tax returns, profit and loss statements, balance sheets, and the like). Enterprise administrator computing device 120 may use standard industry practices, as well as enterprise-specific practices, to determine the projected credit score associated with the client. The projected credit score may assist the enterprise organization in determining whether to approve or deny the client-initiated transaction request. For example, if the client-initiated transaction request is a request for a small business loan, then the enterprise organization may use the projected credit score to gauge the likelihood of the client's successful and timely repayment of the loan. The projected credit score may be one enterprise-specific data element that the enterprise organization may consider in determining whether to approve or deny the client-initiated transaction request. As discussed in subsequent steps, the enterprise organization may also weigh a projected risk score associated with the client-initiated transaction request. To determine a projected risk score, enterprise administrator computing device 120 may identify risk analysis criteria.

Figure 4G:
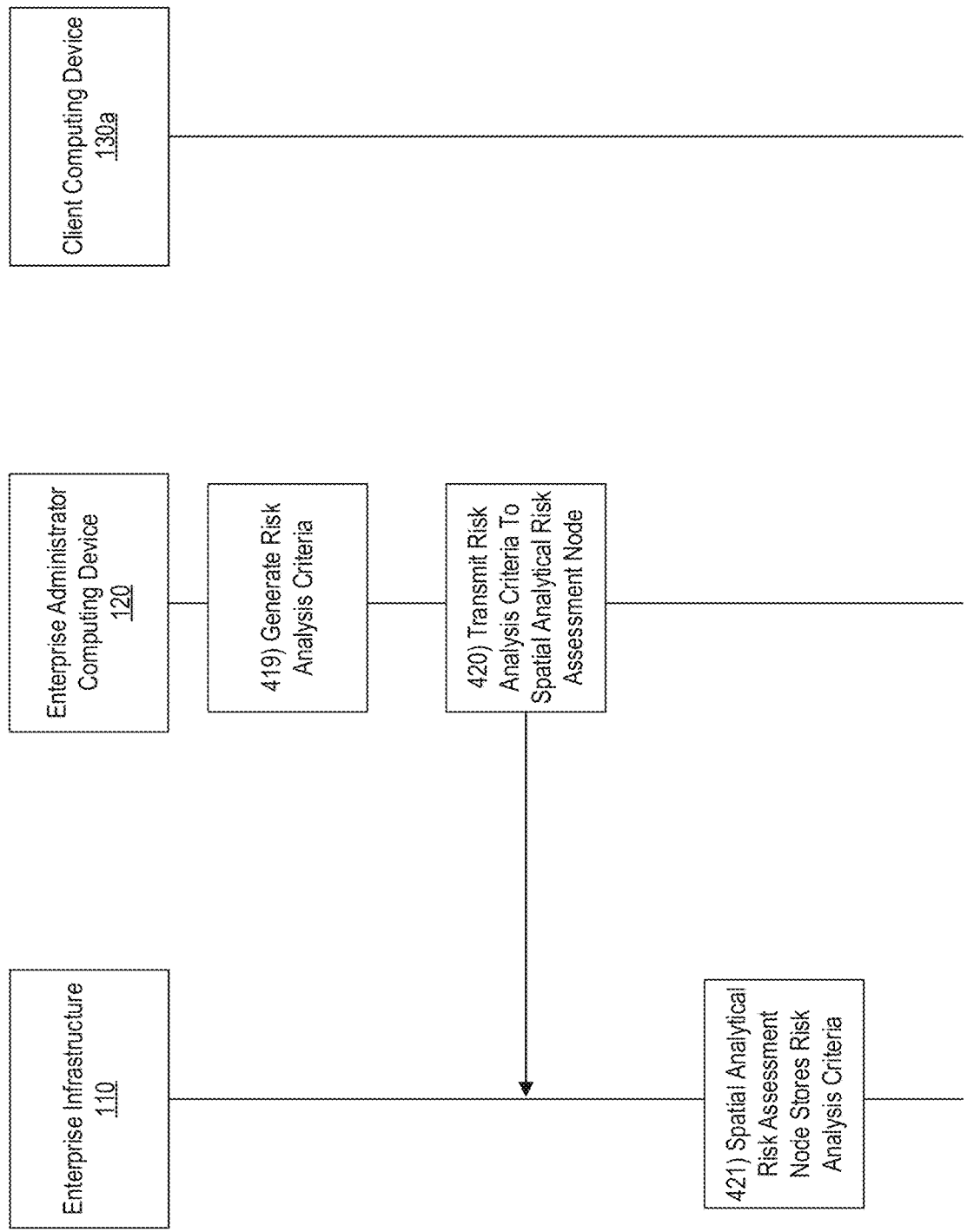

Referring to FIG. 4G, at step 419, enterprise administrator computing device 120 may identify risk analysis criteria. Risk analysis criteria may include various factors that the enterprise organization may consider when determining whether to approve or deny the client-initiated transaction request. In particular, risk analysis criteria may comprise geographic risk factors. Geographic risk factors may describe the geographic region associated with the geocode coordinates that were generated in step 411. As discussed in connection with steps 410 and 411, the geocode coordinates may indicate the location of the client and/or the location of the property associated with the client-initiated transaction request. As such, the geographic risk factors associated with the geocode coordinates may indicate geographic challenges that may affect the success of the client-initiated transaction request.

Geographic risk factors may describe the features of the geographic location associated with the client and/or the property associated with the client-initiated transaction request, and may indicate the location's proclivity to particular weather patterns. For example, the geographic risk factors may indicate the terrain associated with the location (i.e., a swamp, desert, valley, etc.), the type(s) of agriculture capable of growth in the location (i.e., wheat, rice, corn, etc.), the location's proximity to a body of water, the location's proximity to basic resources, naturally occurring features within the location (i.e., mountains, rainforests, glaciers, etc.), the location's proclivity to a particular weather condition (i.e., proclivity for dry weather in a desert, proclivity for flooding near the coast, proclivity for extreme heat near the equator, etc.), and the like.

The enterprise organization may use the geographic risk factors when determining whether to approve or deny the client-initiated transaction request. In particular, the enterprise organization may use the geographic risk factors to measure a likelihood of success of the client-initiated transaction request based on geographic features associated with the geocode coordinates, projected catastrophe data associated with the geocode coordinates, or the like. For example, the client-initiated transaction request may be a business loan request wherein the business comprises shipping locally-grown wheat to overseas consumers. To determine whether to approve or deny the business loan request, the enterprise organization may use the geographic risk factors, discussed above. In doing so, the enterprise organization may determine that the client may be located in a desert and might not have direct access to a body of water. The enterprise organization may consider these factors when determining the likelihood of success of the client's wheat-shipping business plan. As discussed in subsequent steps, the geographic risk factors described herein may be used to generate an interactive spatial risk analysis model that the enterprise organization may use to decide whether to approve or deny the client-initiated transaction request.

At step 420, enterprise administrator computing device 120 may transmit the generated risk analysis criteria to spatial analytical risk assessment node 114a. The transmission of the generated risk analysis criteria may occur over the network connection established in step 414.

At step 421, spatial analytical risk assessment node 114a may store the received risk analysis criteria in KYC database 111 of enterprise infrastructure 110. KYC database 111 of enterprise infrastructure 110 may contain a complete document history associated with each client. KYC database 111 may further include data pertaining to the location associated with the client. For example, KYC database 111 may contain the geocode coordinates associated with the client as well as data that describes the geographic location associated with the client or requested transaction (i.e., the geographic risk factors associated with the client). Spatial analytical risk assessment node 114a may store the risk analysis criteria to ensure the location data for each client is up-to-date and reflects any changes in the client location.

Referring to FIG. 4H, at step 422, spatial analytical risk assessment node 114a may generate analytical overlays using the geographic risk factors generated in step 419. An analytical overlay may be a two-dimensional visual representation of a particular data element. In particular, the analytical overlay may be a two-dimensional visual representation of the geographic risk factors generated in step 419. Each geographic risk factor generated in step 419 may be translated into an individual analytical overlay. For example, a single analytical overlay may include a visual representation of the terrain associated the geocode coordinates while a different analytical overlay may include a visual representation of the naturally occurring features associated with the geocode coordinates.

At step 423, spatial analytical risk assessment node 114a may generate an analytical overlay using the geocode coordinates generated in step 411. An analytical overlay may be a two-dimensional visual representation of a particular data element. In particular, the analytical overlay may be a two-dimensional visual representation of the geocode coordinates generated in step 411. The geocode coordinates may represent longitude and latitude coordinates corresponding to a geographic location associated with the client. Additionally or alternatively, the geocode coordinates may represent longitude and latitude coordinates corresponding to the geographic location of the property associated with the client-initiated transaction request. The analytical overlay may be comprised of a coordinate system wherein the portion of the coordinate system displayed in the analytical overlay may correspond to the geocode coordinates associated with the client. Additionally or alternatively, the analytical overlay may be comprised of a coordinate system wherein the portion of the coordinate system displayed in the analytical overlay may correspond to the location of the property associated with the client-initiated transaction request.

At step 424, spatial analytical risk assessment node 114a may stack the analytical overlays generated in steps 422 and 423. To stack the analytical overlays, spatial analytical risk assessment node 114a may use analytical operators. Stacking the analytical overlays may include determining the total number of analytical overlays. Stacking the analytical overlays may include identifying a numerical order in which to stack the analytical overlays. Stacking the analytical overlays may further include using analytical operators to order the analytical overlays in accordance with the identified numerical order. For example, spatial analytical risk assessment node 114a may determine that the analytical overlay corresponding to the geocode coordinates may be the base overlay, the analytical overlay corresponding to the terrain associated with the geocode coordinates may be the second overlay, and the analytical overlay corresponding to the naturally occurring features within the location associated with the geocode coordinates may be the third overlay. Spatial analytical risk assessment node 114a may repeat the stacking process until spatial analytical risk assessment node 114a identifies the numerical order of each analytical overlay.

Figure 6:
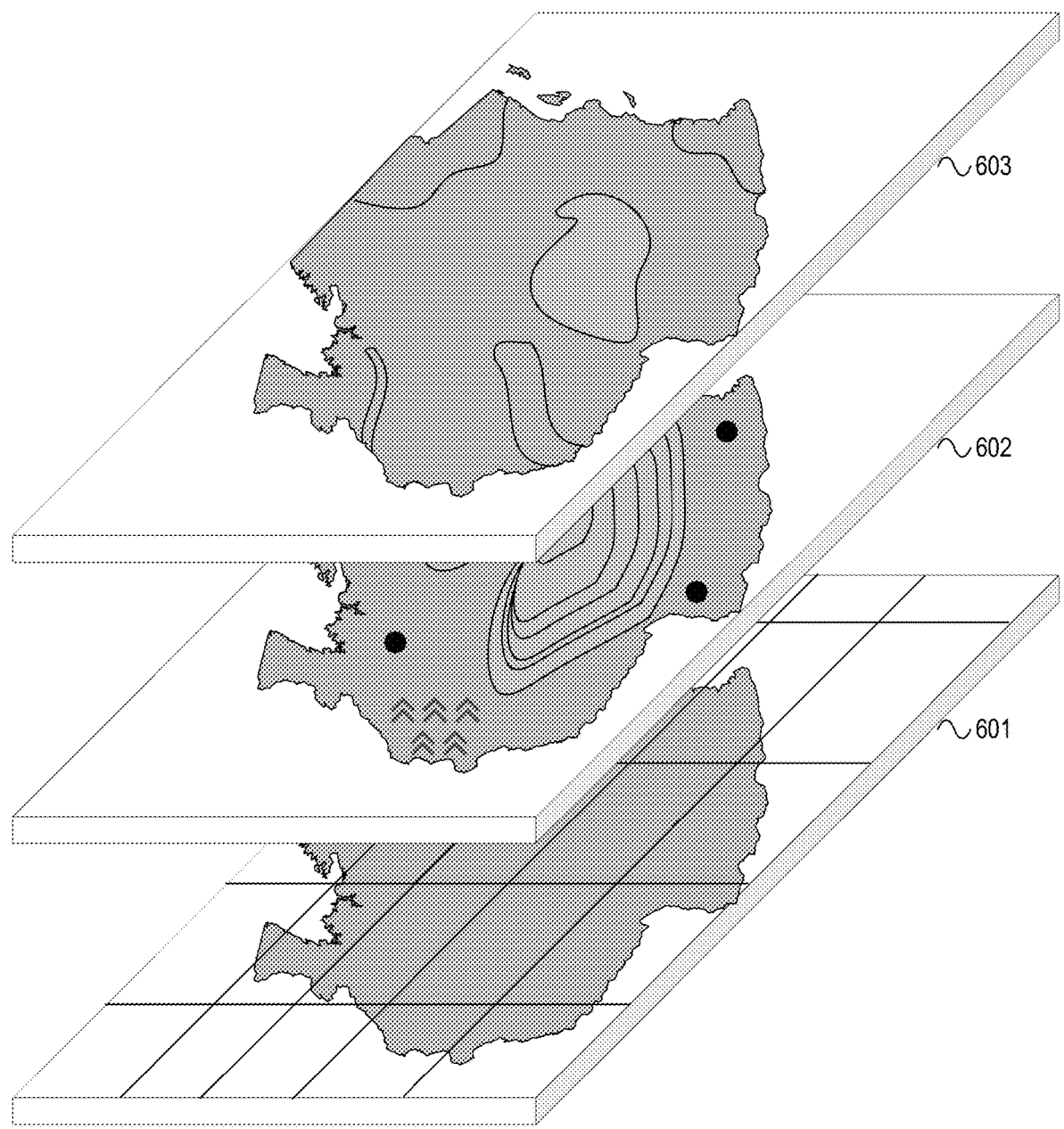
FIG. 6 depicts an illustrative example of a spatial risk analysis model that may be used for geocoding geocode datasets in KYC blockchain data blocks for spatial analytical risk modeling in accordance with one or more example embodiments.

FIG. 6 depicts a series of stacked analytical overlays. Each analytical overlay may correspond to a different geographic risk factor. For example, the base overlay, item 601, may correspond to the geocode coordinates associated with the client. The second analytical overlay, item 602, may indicate the terrain of the geographic location associated with the client. The third analytical overlay, item 603, may indicate the bodies of water within the geographic location associated with the client. While FIG. 6 contains three analytical overlays, a series of stacked analytical overlays may contain more than three analytical overlays. Additionally or alternatively, while FIG. 6 contains three analytical overlays, a series of stacked analytical overlays may contain less than three analytical overlays. In addition, the overlay arrangement provided in FIG. 6 is merely one example overlay arrangement. Various other overlay arrangements (e.g., order of overlays, types of overlays, number of overlays, and the like) may be used without departing from the invention.

Referring to FIG. 4I, at step 425, spatial analytical risk assessment node 114a may generate an interactive spatial risk analysis model using the stacked overlays generated in step 424. The interactive spatial risk analysis model may allow the enterprise organization to modify or adjust the model (i.e., hide a particular analytical overlay from consideration, highlight only the first and third analytical overlays for consideration, etc.). The enterprise organization may use the interactive spatial risk analysis model to consider all variations and combinations of the geographic location data associated with the client. The enterprise organization may use the interactive spatial risk analysis model when determining whether to approve or deny the client-initiated transaction request.

For example, the enterprise organization may consider solely the analytical overlay indicating proximity to a body of water and the analytical overlay indicating the terrain of the geographic location associated with the geocode coordinates. However, the interactive spatial risk analysis model may contain several different analytical overlays. Using the interactive feature of the interactive spatial risk analysis model, the enterprise organization may highlight the analytical overlays of interest and may analyze the data presented solely in the highlighted analytical overlays.

At step 426, spatial analytical risk assessment node 114a may use the interactive spatial risk analysis model to determine a projected risk score associated with the client-initiated transaction request. To determine a projected risk score associated with the client-initiated transaction request, spatial analytical risk assessment node 114a may require the totality of the geographic location data associated with the client. To determine a projected risk score associated with the client, spatial analytical risk assessment node 114a may receive, from the enterprise organization, enterprise-specific rules and guidelines for determining the projected risk score. The enterprise-specific rules and guidelines may include procedures for determining a weight associated with each analytical overlay within the interactive spatial risk analysis model. Spatial analytical risk assessment node 114a may apply the enterprise-specific rules and guidelines to the interactive spatial risk analysis model to determine a projected risk score.

At step 427, spatial analytical risk assessment node 114a may transmit the projected risk score to enterprise administrator computing device 120. The transmission of the projected risk score may occur over the network connection established in step 414.

Referring to FIG. 4J, at step 428, enterprise administrator computing device 120 may store the projected risk score transmitted in step 427. As discussed in connection with FIG. 2, enterprise administrator computing device 120 may be one of full node computing device 210A-210F. As such, enterprise administrator computing device 120 may store the financial documentation and identification documentation in memory 220 of any of full node computing devices 210A-210F.

At step 429, enterprise administrator computing device 120 may determine the overall risk associated the client-initiated transaction request. Determining the overall risk associated with the client-initiated transaction request may include considering the projected credit score, generated in step 418, and the projected risk score, generated in step 426. Enterprise administrator computing device 120 may use the projected credit score to determine the likelihood of success of the client-initiated transaction request based on the history of financial transactions associated with the client. For example, if the client-initiated transaction request is a business loan request, enterprise administrator computing device 120 may consider whether the client has received a loan in the past and, if so, whether the client repaid the loan successfully and in a timely manner. Furthermore, enterprise administrator computing device 120 may use the projected risk score to determine the likelihood of success of the client-initiated transaction request based on geographic risk elements associated with the client. For example, if the client-initiated transaction request is a business loan request for an overseas wheat-shipping business, enterprise administrator computing device 120 may consider whether the client is located in a region where the client may grow wheat and whether the client is located near a body of water such that the client may deliver the wheat to consumers located overseas. Enterprise administrator computing device 120 may weigh both the projected credit score and projected risk score to determine the overall risk associated with the client-initiated transaction request.

At step 430, enterprise administrator computing device 120 may determine whether to approve or deny the client-initiated transaction request. To determine whether to approve or to deny the client-initiated transaction request, enterprise administrator computing device 120 may consult the determination of overall risk associated with the client-initiated transaction request, discussed in connection with step 429. Based on the overall risk associated with the client-initiated transaction request, determined in step 429, enterprise administrator computing device 120 may either approve or deny the client-initiated transaction request.

Figure 4K:
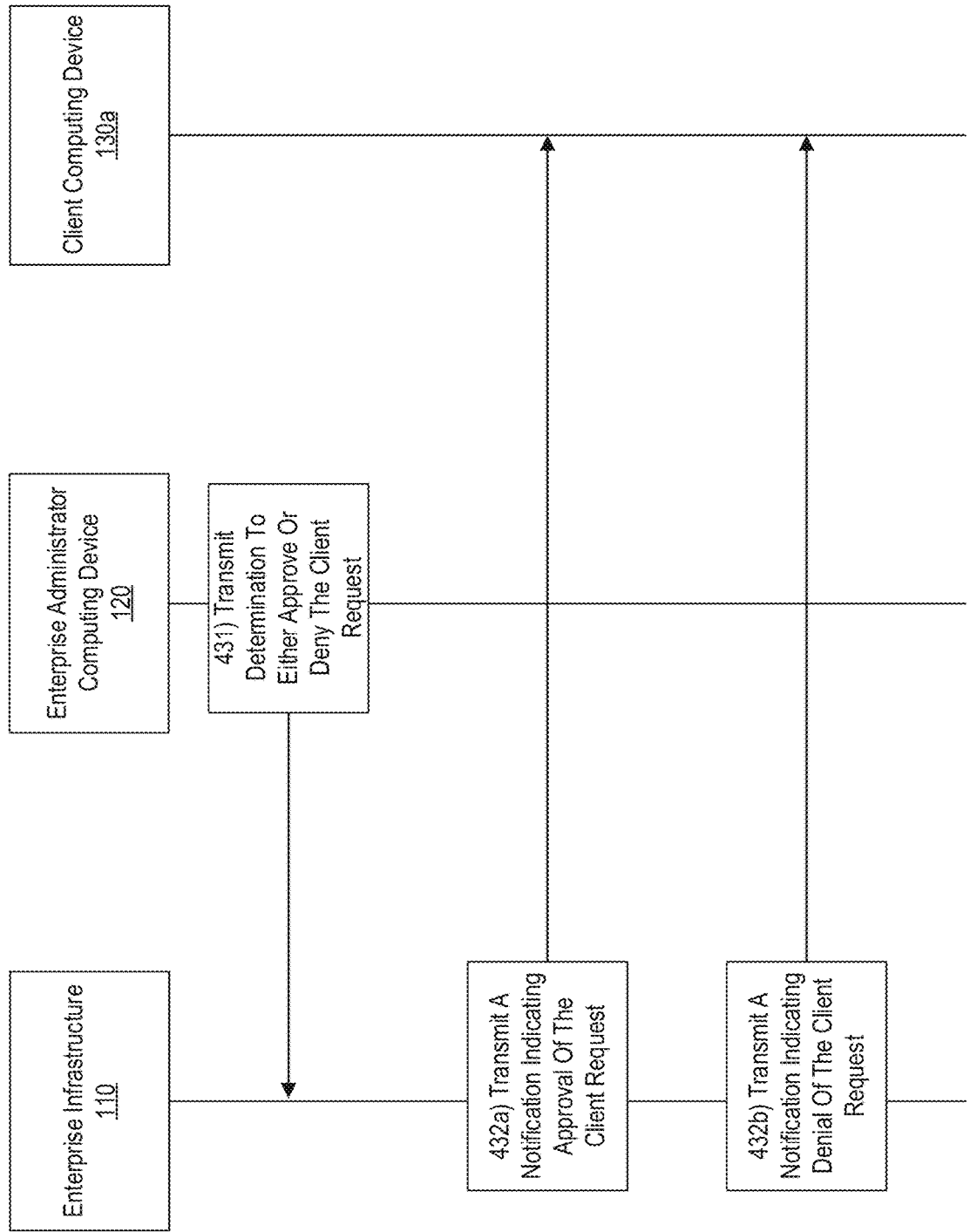

Referring to FIG. 4K, at step 431, enterprise administrator computing device 120 may transmit, to enterprise infrastructure 110, the decision to either approve or deny the client-initiated transaction request. The transmission of the decision to approve or to deny the client-initiated transaction request may occur over the network connection established in step 414.

At step 432a, enterprise infrastructure 110 may transmit, to client computing device 130a, a notification indicating approval of the client-initiated transaction request. The transmission of the decision to approve the client-initiated transaction request may occur over the network connection established in step 401.

Additionally or alternatively, at step 432b, enterprise infrastructure 110 may transmit, to client computing device 130a, a notification indicating denial of the client-initiated transaction request. The transmission of the decision to deny the client-initiated transaction request may occur over the network connection established in step 401.

Figure 5:
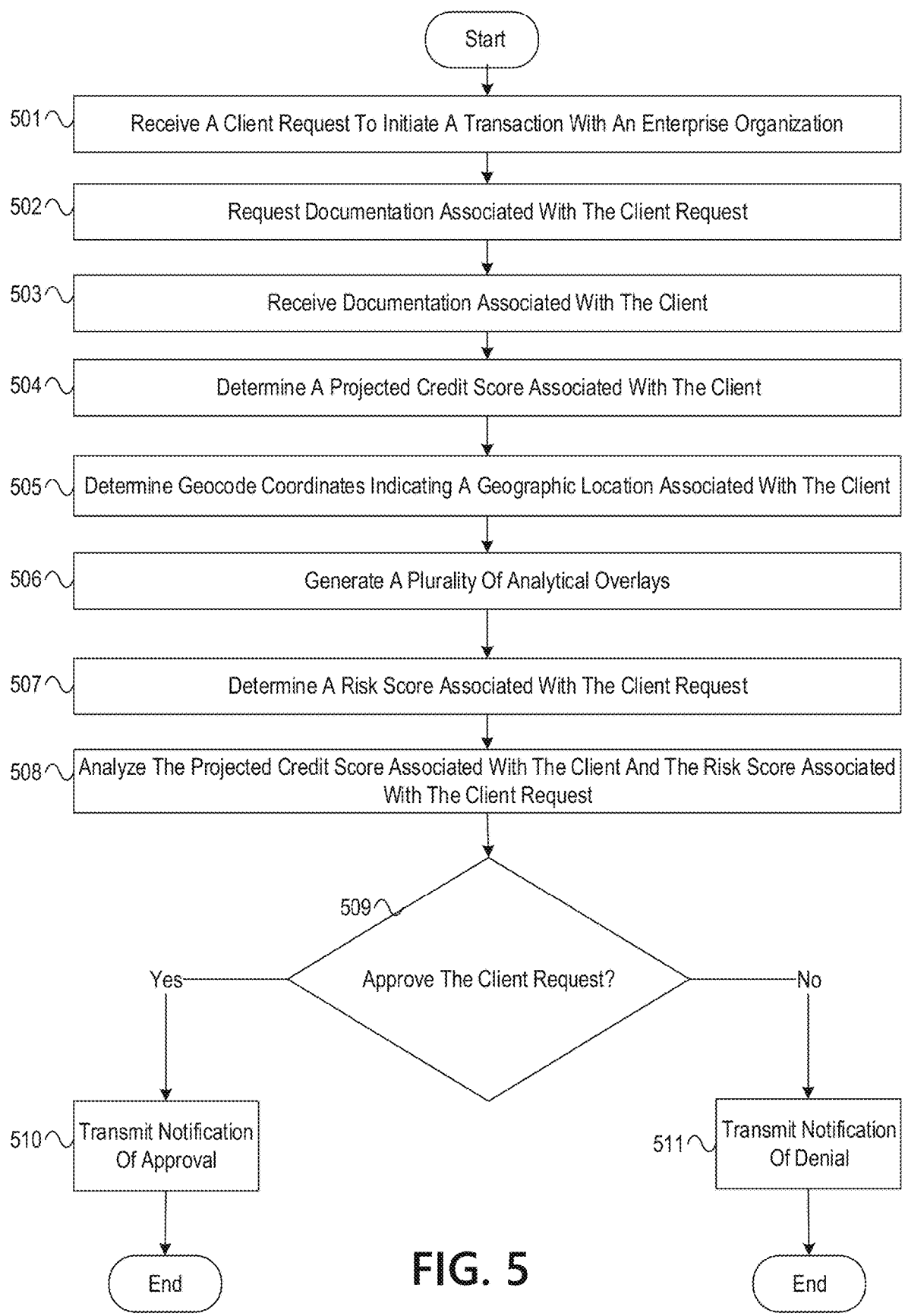
FIG. 5 depicts an illustrative method for geocoding geocode datasets in KYC blockchain data blocks for spatial analytical risk modeling in accordance with one or more example embodiments.

FIG. 5 depicts a flow diagram illustrating one example method for geocoding geocode datasets in KYC blockchain data blocks for spatial analytical risk modeling in accordance with one or more aspects described herein. The processes illustrated in FIG. 5 are merely sample processes and functions. The steps shown may be performed in the order shown, in a different order, more steps may be added, or one or more steps may be omitted, without departing from the invention. In some examples, one or more steps may be performed simultaneously with other steps shown and described.

At step 501, enterprise infrastructure 110 may receive a client request to initiate a transaction with an enterprise organization. Enterprise infrastructure 110 may receive the client-initiated request from client computing device 130a. The client associated with client computing device 130a may use client computing device 130a to navigate to a webpage or web application associated with the enterprise organization. Using the webpage or web application associated with the enterprise organization, client computing device 130a may locate the client portal for transaction request submissions. The client associated with client computing device 130a may use the located client portal to submit the request to initiate a transaction with the enterprise organization. Enterprise infrastructure 110 may use the client portal to access the submitted client request to initiate a transaction with the enterprise organization.

At step 502, enterprise infrastructure 110 may review the received client request and may request financial documentation and identification documentation that the enterprise organization may require to determine whether to approve or deny the client request. Financial documentation may include records indicating financial history, assets, expected income and/or revenue, (i.e., tax filing documents, tax returns, profit and loss statements, balance sheets, and the like). Identification documentation may include government issued documents which indicate personal identifiable information (i.e., a client's full name, physical address, unique identifier, telephone number, and the like). Enterprise infrastructure 110 may request additional documentation depending on the request submitted by client computing device 130a. Enterprise infrastructure 110 may send, to client computing device 130a, the request for financial documentation and identification documentation.

At step 503, enterprise infrastructure 110 may receive, from client computing device 130a, the documentation requested in step 501.

At step 504, enterprise administrator computing device 120 may determine a projected credit score associated with the client associated with the financial documentation received in step 503. Financial documentation may include records indicating financial history, assets, expected income and/or revenue, (i.e., tax filing documents, tax returns, profit and loss statements, balance sheets, and the like). Enterprise administrator computing device 120 may use standard industry practices, as well as enterprise-specific practices, to determine the projected credit score associated with the client. The projected credit score may assist the enterprise organization in determining whether to approve or deny the client-initiated transaction request. For example, if the client-initiated transaction request is a request for a small business loan, then the enterprise organization may use the projected credit score to gauge the likelihood of the client's successful and timely repayment of the loan. The projected credit score may be one enterprise-specific data element that the enterprise organization may consider in determining whether to approve or deny the client-initiated transaction request.

At step 505, enterprise infrastructure 110 may determine geocode coordinates indicating a geographic location associated with the client and/or the requested transaction. Enterprise infrastructure 110 may determine the geocode coordinates using the identification documentation and/or financial documentation received in step 503. Enterprise infrastructure 110 may use the physical location associated with the client and/or the client request (e.g., a property address associated with the transaction), found in the identification documentation and/or financial documentation (e.g., an identified address of a property for which a mortgage is being requested, or the like), to generate geocode coordinates. To generate geocode coordinates, enterprise infrastructure 110 may use the physical location associated with the client and/or the client request to determine where, on the Earth's surface, the client or property is located. Enterprise infrastructure 110 may identify longitude and latitude coordinates that correspond to the client's location, location of the property, or the like, on the Earth's surface. Enterprise infrastructure 110 may concatenate the longitude and latitude coordinates to generate geocode coordinates.

At step 506, enterprise infrastructure 110 may generate a plurality of analytical overlays. An analytical overlay may be a two-dimensional visual representation of a particular data element. In particular, the analytical overlay may be a two-dimensional visual representation of the geographic risk factors. Geographic risk factors may describe the geographic region associated with the geocode coordinates that were generated in step 505. The geocode coordinates may indicate the location of the client and/or the location of the property associated with the client request. By extension, the geographic risk factors associated with the geocode coordinates may indicate geographic challenges that may affect the success of the client-initiated transaction request.

Geographic risk factors may describe the features of the geographic location and may indicate the location's proclivity to particular weather patterns. For example, the geographic risk factors may indicate the terrain associated with the location (i.e., a swamp, desert, valley, etc.), the type(s) of agriculture capable of growth in the location (i.e., wheat, rice, corn, etc.), the location's proximity to a body of water, the location's proximity to basic resources, naturally occurring features within the location (i.e., mountains, rainforests, glaciers, etc.), the location's proclivity to a particular weather condition (i.e., proclivity for dry weather in a desert, proclivity for flooding at a location near the coast, proclivity for extreme heat near the equator, etc.), and the like.

In some examples, each geographic risk factor may be translated into an individual analytical overlay. For example, a single analytical overlay may include a visual representation of the terrain associated the geocode coordinates while a different analytical overlay may include a visual representation of the naturally occurring features associated with the geocode coordinates. Additionally or alternatively, an individual overlay may represent more than one geographic risk factor.

Furthermore, an analytical overlay may be a two-dimensional visual representation of the geocode coordinates generated in step 505. The geocode coordinates may represent longitude and latitude coordinates corresponding to a geographic location associated with the client or the client request. The analytical overlay may be comprised of a coordinate system wherein the portion of the coordinate system displayed in the analytical overlay may correspond to the geocode coordinates associated with the client or the client request.

At step 507, enterprise infrastructure 110 may determine a projected risk score associated with the client request. To determine a projected risk score associated with the client request, enterprise infrastructure 110 may use an interactive spatial risk analysis model. The interactive spatial risk analysis model may consist of the plurality of analytical overlays generated in step 506. In particular, the interactive spatial risk analysis model may consist of stacked analytical overlays. To stack the analytical overlays, enterprise infrastructure 110 may use analytical operators. Stacking the analytical overlays may include determining the total number of analytical overlays, identifying a numerical order in which to stack the analytical overlays, using analytical operators to order the analytical overlays in accordance with the identified numerical order, and the like. For example, enterprise infrastructure 110 may determine that the analytical overlay corresponding to the geocode coordinates may be the base overlay, the analytical overlay corresponding to the terrain associated with the geocode coordinates may be the second overlay, and the analytical overlay corresponding to the naturally occurring features within the location associated with the geocode coordinates may be the third overlay. Enterprise infrastructure 110 may repeat the stacking process until enterprise infrastructure 110 identifies the numerical order of each analytical overlay.

The interactive spatial risk analysis model may allow the enterprise organization to modify or adjust the model (i.e., hide a particular analytical overlay from consideration, highlight only the first and third analytical overlays for consideration, etc.). The enterprise organization may use the interactive spatial risk analysis model to consider all variations and combinations of the geographic location data associated with the client and/or the client request. In some examples, the enterprise organization may use the interactive spatial risk analysis model when determining whether to approve or deny the client-initiated transaction request. For example, the enterprise organization may consider solely the analytical overlay indicating proximity to a body of water and the analytical overlay indicating the terrain of the geographic location associated with the geocode coordinates. However, the interactive spatial risk analysis model may contain several different analytical overlays. For instance, in some arrangements, the interactive spatial risk analysis model may include several different analytical overlays. Using the interactive feature of the interactive spatial risk analysis model, the enterprise organization may highlight the analytical overlays of interest and may analyze the data presented solely in the highlighted analytical overlays.

Enterprise infrastructure 110 may use the interactive spatial risk analysis model to determine a projected risk score associated with the client request. To determine a projected risk score associated with the client request, enterprise infrastructure 110 may require the totality of the geographic location data associated with the client. To determine a projected risk score associated with the client request, enterprise infrastructure 110 may receive, from the enterprise organization, enterprise-specific rules and guidelines for determining the projected risk score. The enterprise-specific rules and guidelines may include procedures for determining a weight associated with each analytical overlay within the interactive spatial risk analysis model. Enterprise infrastructure 110 may apply the enterprise-specific rules and guidelines to the interactive spatial risk analysis model to determine a projected risk score.

At step 508, enterprise administrator computing device 120 may analyze the projected credit score associated with the client and the risk score associated with the client request. Enterprise administrator computing device 120 may analyze the projected credit score associated with the client and the risk score associated with the client request to determine an overall risk score associated with the client request. Enterprise administrator computing device 120 may use the projected credit score to determine the likelihood of success of the client-initiated transaction request based on the history of financial transactions associated with the client. For example, if the client-initiated transaction request is a business loan request, enterprise administrator computing device 120 may consider whether the client has received a loan in the past and, if so, whether the client repaid the loan successfully and in a timely manner. Furthermore, enterprise administrator computing device 120 may use the projected risk score to determine the likelihood of success of the client-initiated transaction request based on geographic risk elements associated with the client. For example, if the client-initiated transaction request is a business loan request for an overseas wheat-shipping business, enterprise administrator computing device 120 may consider whether the client is located in a region where the client may grow wheat and whether the client is located near a body of water such that the client may deliver the wheat to consumer located overseas. Enterprise administrator computing device 120 may weigh both the projected credit score and projected risk score to determine the overall risk associated with the client request.

At step 509, enterprise administrator computing device 120 may determine whether to approve or deny the client request. To determine whether to approve or to deny the client-initiated transaction request, enterprise administrator computing device 120 may consult the determination of overall risk associated with the client request, discussed in connection with step 508. Based on the overall risk associated with the client request, determined in step 508, enterprise administrator computing device 120 may either approve or deny the client request. Enterprise administrator computing device 120 may transmit, to enterprise infrastructure 110, the decision to approve or deny the client request.

At step 510, in response to the decision to approve the client request, enterprise infrastructure 110 may transmit, to client computing device 130*a*, a notification indicating approval of the client request.

Additionally or alternatively, at step 511, in response to the decision to deny the client request, enterprise infrastructure 110 may transmit, to client computing device 130*a*, a notification indicating denial of the client request.

The features described herein significantly improve the current method of discovery and investigation that is needed to approve or deny a transaction submitted, by a client, to an enterprise organization. In particular, the features described herein may provide the following benefits: 1) allow an enterprise organization to make real-time decisions regarding client requests; 2) secure methods for providing and sharing geographic location information associated with a client and a client request; 3) decentralized computing which allows more time to be spent on analyzing data and less time to be spent on training AI models; and 4) predictive catastrophe modelling.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A method comprising:
at a computing device configured to operate in a peer-to-peer (P2P) network and including at least one or more processors and memory storing at least a portion of a blockchain of the P2P network:

receiving, from a client computing device associated with a client, a client request to initiate a transaction at an enterprise organization;

receiving, from the client computing device and in response to the receiving the client request, financial documentation associated with the client and identification documentation associated with the client;

determining, based on the received financial documentation, a projected credit score associated with the client;

determining, based on the received identification documentation, geocode coordinates indicating a geographic location associated with the client request to initiate the transaction at the enterprise organization;

generating a plurality of analytical overlays, wherein each analytical overlay includes a two-dimensional visual representation of a particular data element and wherein at least one analytical overlay includes a two-dimensional visual representation of a geographic risk factor identified based on the geocode coordinates;

stacking the plurality of analytical overlays, wherein stacking the plurality of analytical overlays includes:

identifying a numerical order in which to stack the plurality of analytical overlays, wherein the numerical order includes a first position including an analytical overlay corresponding to the geocode coordinates and at least a second position including an analytical overlay corresponding to at least one geographic feature of the geographic location corresponding to the geocode coordinates; and ordering, using analytical operators, the plurality of analytical overlays in the identified numerical order;

determining, based on the plurality of the analytical overlays, a risk score associated with the client request to initiate the transaction at the enterprise organization;

analyzing the projected credit score associated with the client and the risk score associated with the client request to initiate the transaction at the enterprise organization; and generating a notification, wherein the notification indicates one of:

approval of the client request to initiate the transaction at the enterprise organization; or rejection of the client request to initiate the transaction at the enterprise organization.

2. The method of claim 1, wherein the receiving the financial documentation associated with the client and the identification documentation associated with the client comprises receiving the financial documentation associated with the client and the identification documentation associated with the client from an identity wallet subscription associated with the client.

3. The method of claim 1, wherein the determining the geocode coordinates comprises converting a physical address associated with a property associated with the client request into longitude and latitude coordinates on a geographic coordinate system.

4. The method of claim 1, wherein the geographic risk factors measure a likelihood of success of the client request based on:

geographic features associated with the geocode coordinates including the at least one geographic feature of the geographic location corresponding to the geocode coordinates; and projected catastrophe data associated with the geocode coordinates.

5. The method of claim 1, wherein the determining the risk score associated with the client request to initiate the transaction at the enterprise organization comprises generating an interactive spatial risk analysis model based on the stacked analytical overlays.

6. The method of claim 1, wherein the analyzing the projected credit score associated with the client and the risk score associated with the client comprises:

measuring a projected success of the client request based on a history of financial transactions associated with the client;

measuring a projected success of the client request based on geographic risk elements associated with the client request; and weighing the projected success of the client request based on the history of financial transactions associated with the client against the projected success of the client request based on the geographic risk elements associated with the client request.

7. A computing platform comprising:

at least one processor;

a communication interface communicatively coupled to the at least one processor; and memory storing computer-readable instructions that, when executed by the at least one processor, cause the computing platform to:

receive, from a client computing device associated with a client, a client request to initiate a transaction at an enterprise organization;

receive, from the client computing device and in response to the receiving the client request, financial documentation associated with the client and identification documentation associated with the client;

determine, based on the received financial documentation, a projected credit score associated with the client;

determine, based on the received identification documentation, geocode coordinates indicating a geographic location associated with the client request to initiate the transaction at the enterprise organization;

generate a plurality of analytical overlays, wherein each analytical overlay includes a two-dimensional visual representation of a particular data element and wherein at least one analytical overlay includes a two-dimensional visual representation of a geographic risk factor identified based on the geocode coordinates;

stack the plurality of analytical overlays, wherein stacking the plurality of analytical overlays includes:

identifying a numerical order in which to stack the plurality of analytical overlays wherein the numerical order includes a first position including an analytical overlay corresponding to the geocode coordinates and at least a second position including an analytical overlay corresponding to at least one geographic feature of the geographic location corresponding to the geocode coordinates; and ordering, using analytical operators, the plurality of analytical overlays in the identified numerical order;

determine, based on the plurality of the analytical overlays, a risk score associated with the client request to initiate the transaction at the enterprise organization;

analyze the projected credit score associated with the client and the risk score associated with the client request to initiate the transaction at the enterprise organization; and generate a notification, wherein the notification indicates one of:

approval of the client request to initiate the transaction at the enterprise organization; or rejection of the client request to initiate the transaction at the enterprise organization.

8. The computing platform of claim 7, wherein the determining the geocode coordinates comprises converting a physical address associated with a property associated with the client request the client into longitude and latitude coordinates on a geographic coordinate system.

9. The computing platform of claim 7, wherein the geographic risk factors are identified by the enterprise organization.

10. The computing platform of claim 9, wherein the geographic risk factors measure a likelihood of success of the client request based on:
geographic features associated with the geocode coordinates including the at least one geographic feature of the geographic location corresponding to the geocode coordinates; and
projected catastrophe data associated with the geocode coordinates.

11. The computing platform of claim 7, wherein the determining the risk score associated with the client request to initiate the transaction at the enterprise organization comprises generating an interactive spatial risk analysis model based on the stacked analytical overlays.

12. The computing platform of claim 7, wherein the analyzing the projected credit score associated with the client and the risk score associated with the client comprises:
measuring a projected success of the client request based on a history of financial transactions associated with the client;
measuring a projected success of the client request based on geographic risk elements associated with the client request; and
weighing the projected success of the client request based on the history of financial transactions associated with the client against the projected success of the client request based on the geographic risk elements associated with the client request.

13. One or more non-transitory computer-readable media storing instructions that, when executed by a computing platform comprising at least one processor, memory, and a communication interface, cause the computing platform to:
receive, from a client computing device associated with a client, a client request to initiate a transaction at an enterprise organization;
receive, from the client computing device and in response to the receiving the client request, financial documentation associated with the client and identification documentation associated with the client;
determine, based on the received financial documentation, a projected credit score associated with the client;
determine, based on the received identification documentation, geocode coordinates indicating a geographic location associated with the client request to initiate the transaction at the enterprise organization;
generate a plurality of analytical overlays, wherein each analytical overlay includes a two-dimensional visual representation of a particular data element and wherein at least one analytical overlay includes a two-dimensional visual representation of a geographic risk factor identified based on the geocode coordinates;
stack the plurality of analytical overlays, wherein stacking the plurality of analytical overlays includes:
identifying a numerical order in which to stack the plurality of analytical overlays wherein the numerical order includes a first position including an analytical overlay corresponding to the geocode coordinates and at least a second position including an analytical overlay corresponding to at least one geographic feature of the geographic location corresponding to the geocode coordinates; and
ordering, using analytical operators, the plurality of analytical overlays in the identified numerical order;
determine, based on the plurality of the analytical overlays, a risk score associated with the client request to initiate the transaction at the enterprise organization;
analyze the projected credit score associated with the client and the risk score associated with the client request to initiate the transaction at the enterprise organization; and
generate a notification, wherein the notification indicates one of:
approval of the client request to initiate the transaction at the enterprise organization; or
rejection of the client request to initiate the transaction at the enterprise organization.

14. The one or more non-transitory computer-readable media of claim 13, wherein the geographic risk factors are identified by the enterprise organization.

15. The one or more non-transitory computer-readable media of claim 14, wherein the geographic risk factors measure a likelihood of success of the client request based on:
geographic features associated with the geocode coordinates including the at least one geographic feature of the geographic location corresponding to the geocode coordinates; and
projected catastrophe data associated with the geocode coordinates.

16. The one or more non-transitory computer-readable media of claim 13, wherein the analyzing the projected credit score associated with the client and the risk score associated with the client comprises:
measuring a projected success of the client request based on a history of financial transactions associated with the client;
measuring a projected success of the client request based on geographic risk elements associated with the client request; and
weighing the projected success of the client request based on the history of financial transactions associated with the client against the projected success of the client request based on the geographic risk elements associated with the client request.

* * * * *

UNITED STATES PATENT AND TRADEMARK OFFICE
CERTIFICATE OF CORRECTION

PATENT NO. : 11,869,007 B2
APPLICATION NO. : 17/378224
DATED : January 9, 2024
INVENTOR(S) : Sujatha Balaji Page 1 of 1

It is certified that error appears in the above-identified patent and that said Letters Patent is hereby corrected as shown below:

In the Claims

Column 28, Claim 7, Line 48:
After "overlays", insert --,--

Column 29, Claim 8, Line 6:
Before "into", delete "the client"

Column 30, Claim 13, Line 7:
After "overlays", insert --,--

Signed and Sealed this
Twenty-sixth Day of August, 2025

Coke Morgan Stewart
*Acting Director of the United States Patent and Trademark Office*